(12) United States Patent
Ha et al.

(10) Patent No.: US 10,942,523 B2
(45) Date of Patent: Mar. 9, 2021

(54) AUTONOMOUS VEHICLE AND METHOD OF CONTROLLING THE SAME

(71) Applicant: LG Electronics Inc., Seoul (KR)

(72) Inventors: Daegeun Ha, Seoul (KR); Sangyol Yoon, Seoul (KR); Heedong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 209 days.

(21) Appl. No.: 16/159,083

(22) Filed: Oct. 12, 2018

(65) Prior Publication Data

US 2019/0113933 A1    Apr. 18, 2019

(30) Foreign Application Priority Data

Oct. 12, 2017 (KR) .................. 10-2017-0132314

(51) Int. Cl.
  *G05D 1/02*   (2020.01)
  *G05D 1/00*   (2006.01)
  (Continued)

(52) U.S. Cl.
  CPC ....... *G05D 1/0238* (2013.01); *B62D 15/0285* (2013.01); *G01S 5/0072* (2013.01);
  (Continued)

(58) Field of Classification Search
  CPC .. G05D 1/0238; G05D 1/0088; G05D 1/0212; G05D 2201/0213; B62D 15/0285;
  (Continued)

(56) References Cited

U.S. PATENT DOCUMENTS

2015/0149022 A1*  5/2015  Harvey ............... G05D 1/0297
                                                   701/23
2016/0185389 A1*  6/2016  Ishijima ............ B62D 15/0285
                                                   701/41

FOREIGN PATENT DOCUMENTS

DE    102015221224    5/2017
KR    1020120094366    8/2012
(Continued)

OTHER PUBLICATIONS

Extended European Search Report in European Application No. 18200097.6, dated Mar. 27, 2019, 9 pages.

*Primary Examiner* — Michael V Kerrigan
(74) *Attorney, Agent, or Firm* — Fish & Richardson P.C.

(57) ABSTRACT

An autonomous vehicle configured to generate a pull-out path to pull-out from a stationary state. The autonomous vehicle includes: an object detection device to detect an object within a distance range of the autonomous vehicle; at least one processor; and at least one computer memory operably connectable to the at least one processor and having stored thereon instructions which, when executed, cause the at least one processor to perform operations including: generating the at least one pull-out path for the autonomous vehicle; based on detecting at least one object blocking the at least one pull-out path, transmitting first information to the at least one object; determining whether second information is received from the at least one object; and controlling the autonomous vehicle to perform the pull-out based on a result of transmitting the first information and whether the second information was received from the at least one object.

20 Claims, 19 Drawing Sheets

(51) Int. Cl.
 *H04W 4/46* (2018.01)
 *G01S 5/00* (2006.01)
 *B62D 15/02* (2006.01)

(52) U.S. Cl.
 CPC ......... *G05D 1/0088* (2013.01); *G05D 1/0212* (2013.01); *H04W 4/46* (2018.02); *G05D 2201/0213* (2013.01)

(58) Field of Classification Search
 CPC ....... H04W 4/46; G01S 5/0072; B60W 30/18; B60W 2556/65; B60W 2554/801
 See application file for complete search history.

(56) References Cited

FOREIGN PATENT DOCUMENTS

| | | |
|---|---:|---|
| KR | 1020130128987 | 11/2013 |
| KR | 101610526 | 4/2016 |
| KR | 1020170104372 | 9/2017 |

\* cited by examiner

FIG. 1
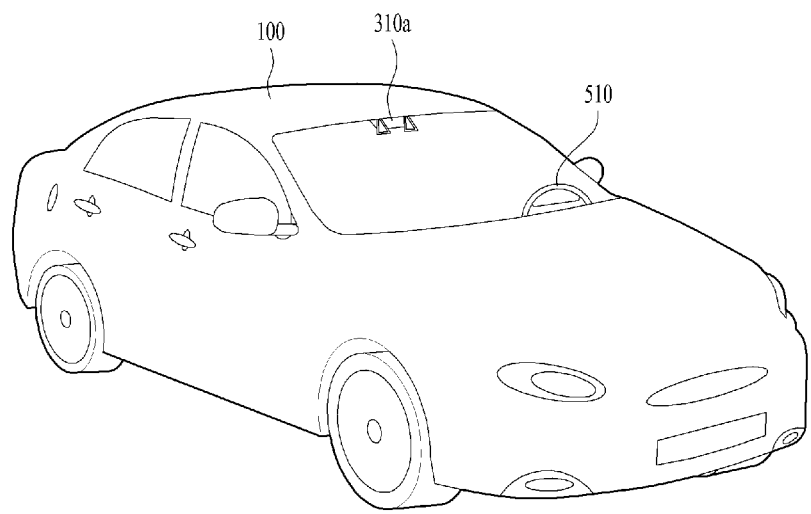
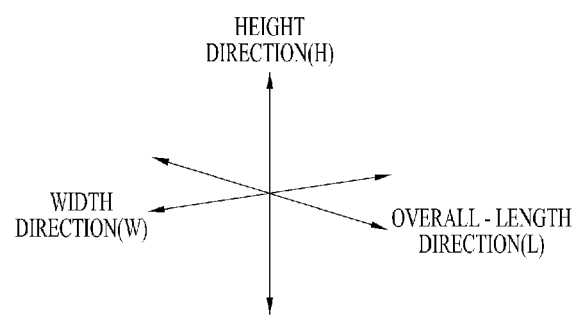

FIG. 20
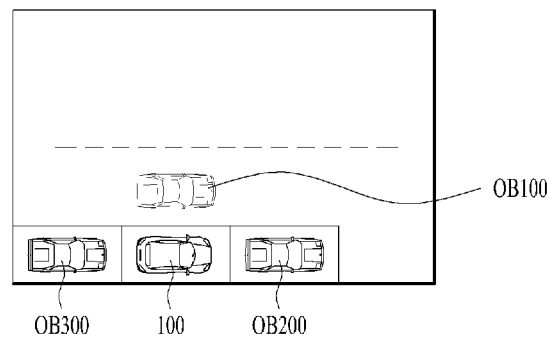
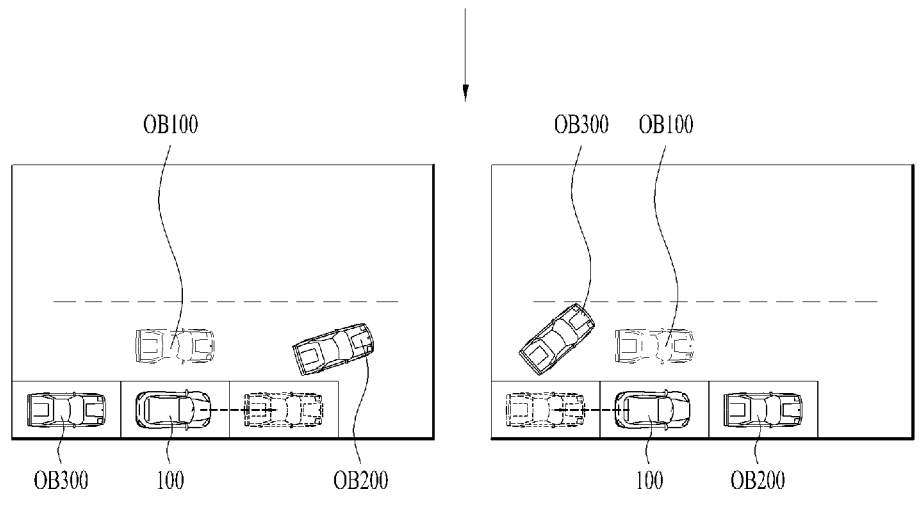

FIG. 23
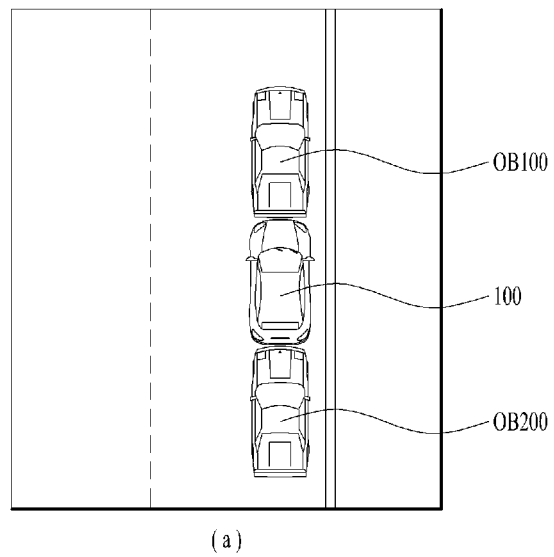
(a)
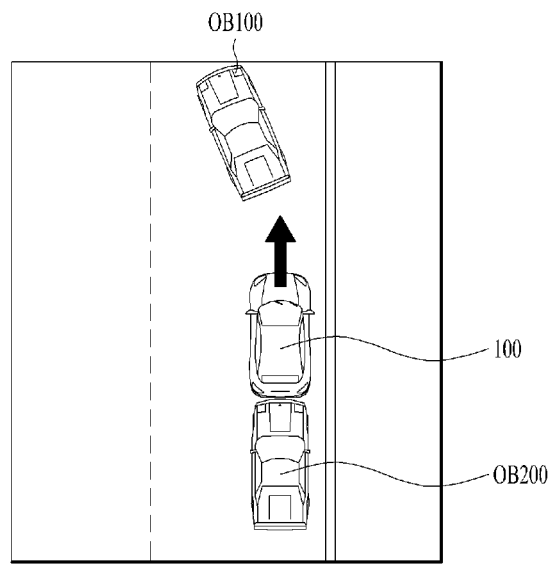
(b)

AUTONOMOUS VEHICLE AND METHOD OF CONTROLLING THE SAME

CROSS-REFERENCE TO RELATED APPLICATIONS

This application claims the benefit of an earlier filing date and right of priority to Korean Patent Application No. 10-2017-0132314, filed on Oct. 12, 2017, which is hereby incorporated by reference as if fully set forth herein.

TECHNICAL FIELD

The present disclosure relates to an autonomous vehicle and a method of controlling the same.

BACKGROUND

A vehicle is an apparatus that is moved in a desired direction by a user riding therein. A typical example of a vehicle is an automobile. Some vehicles are equipped with sensors and electronic devices to provide user convenience. For example, research has been actively conducted on an advanced driver assistance system (ADAS) to provide user convenience for various operations in driving. Further, autonomous vehicles have been developed that control some operations of a vehicle even without a user's active control.

SUMMARY

Implementations disclosed herein enable an autonomous vehicle that adaptively performs a pull-out operation from a stationary state based on detecting objects in its vicinity.

In one aspect, an autonomous vehicle is configured to generate a pull-out path for the autonomous vehicle to perform a pull-out operation from a stationary state, the autonomous vehicle including: an object detection device configured to detect an object within a distance range of the autonomous vehicle; at least one processor; and at least one computer memory that is operably connectable to the at least one processor and that has stored thereon instructions which, when executed by the at least one processor, cause the at least one processor to perform operations including: generating the at least one pull-out path for the autonomous vehicle to perform the pull-out operation from the stationary state; based on a detection of at least one object that is blocking the at least one pull-out path of the autonomous vehicle, transmitting first information to the at least one object through a communication device of the autonomous vehicle; determining whether second information is received from the at least one object through the communication device; and controlling the autonomous vehicle to perform the pull-out operation from the stationary state based on a result of transmitting the first information and a determination of whether the second information was received from the at least one object.

In some implementations, the first information includes information regarding at least one movement for the at least one object that would allow the autonomous vehicle to perform the pull-out operation.

In some implementations, the operations further include: determining whether the at least one object blocks all of the at least one pull-out path of the autonomous vehicle; and transmitting, based on a determination that the at least one object blocks all of the at least one pull-out path of the autonomous vehicle, the first information to the at least one object through the communication device of the autonomous vehicle.

In some implementations, the operations further include: based on the at least one object including a plurality of objects that block all of the at least one pull-out path including a plurality of pull-out paths, determining movement distances for the plurality of objects that would allow the autonomous vehicle to perform the pull-out operation; and according to an ascending order of the movement distances for the plurality of objects that would allow the autonomous vehicle to perform the pull-out operation: determining whether communication can be established with an object among the plurality of objects; and based on a determination that communication can be established with the object, transmitting the first information to the object with which communication can be established.

In some implementations, the operations further include: based on the at least one object including a plurality of objects that block all of the at least one pull-out path including a plurality of pull-out paths, determining priority levels for the plurality of pull-out paths; and according to a descending order of the priority levels for the plurality of pull-out paths, and based on an association between the plurality of objects blocking the plurality of pull-out paths: determining whether communication can be established with an object among the plurality of objects; and based on a determination that communication can be established with the object, transmitting the first information to the object with which communication can be established.

In some implementations, the operations further include: based on the at least one object including a plurality of objects that block the at least one pull-out path, determining distances between the autonomous vehicle and the plurality of objects; and according to an ascending order of the distances between the autonomous vehicle and the plurality of objects: determining whether communication can be established with a first object among the plurality of objects; and based on a determination that communication can be established with the first object, transmitting the first information to the first object with which communication can be established.

In some implementations, the operations further include: based on the first object moving as a result of the transmission of the first information and the reception of the second information to and from the first object: determining whether communication can be established with a second object among the plurality of objects, according to the ascending order of the distances between the autonomous vehicle and the plurality of objects; and based on a determination that communication can be established with the second object, transmitting third information to the second object with which communication can be established.

In some implementations, the operations further include: based on a movement of the first object as a result of the transmission of the first information and the reception of the second information to and from the first object: generating a different pull-out path based on a condition that was modified by the movement of the first object.

In some implementations, the operations further include: based on a determination that (i) the second information is not received from the at least one object or that (ii) the second information received from the at least one object indicates that the at least one object is unable to move: transmitting third information regarding a different movement for the at least one object, different from the previously transmitted first information, to the at least one object through the communication device of the autonomous vehicle.

In some implementations, the operations further include: based on an actual movement distance of the at least one object being less than a requested movement distance included in the first information that was transmitted to the at least one object: transmitting third information regarding a different movement for the at least one object, different from the previously transmitted first information, to the at least one object through the communication device of the autonomous vehicle.

In some implementations, the operations further include: based on the autonomous vehicle being parallel-parked, determining a first distance to a first object located in front of the autonomous vehicle and a second distance to a second object located behind the autonomous vehicle.

In some implementations, the operations further include: based on the first object moving away from the autonomous vehicle, controlling the autonomous vehicle to drive forwards and increase the second distance to the second object to be greater than or equal to a first threshold distance; and based on the second object moving away from the autonomous vehicle, controlling the autonomous vehicle to drive backwards and decrease the first distance to the first object to be greater than or equal to a second threshold distance.

In another aspect of the present disclosure, a method is disclosed of generating a pull-out path for an autonomous vehicle to perform a pull-out operation from a stationary state, the method including: generating the at least one pull-out path for the autonomous vehicle to perform the pull-out operation from the stationary state; based on a detection of at least one object that is blocking the at least one pull-out path of the autonomous vehicle, transmitting first information to the at least one object through a communication device of the autonomous vehicle; determining whether second information is received from the at least one object through the communication device; and controlling the autonomous vehicle to perform the pull-out operation from the stationary state based on a result of transmitting the first information and a determination of whether the second information was received from the at least one object.

In some implementations, first information includes information regarding at least one movement for the at least one object that would allow the autonomous vehicle to perform the pull-out operation.

In some implementations, the method further includes: determining whether the at least one object blocks all of the at least one pull-out path of the autonomous vehicle; and transmitting, based on a determination that the at least one object blocks all of the at least one pull-out path of the autonomous vehicle, the first information to the at least one object through the communication device of the autonomous vehicle.

In some implementations, the method further includes: based on the at least one object including a plurality of objects that block all of the at least one pull-out path including a plurality of pull-out paths, determining movement distances for the plurality of objects that would allow the autonomous vehicle to perform the pull-out operation; and according to an ascending order of the movement distances for the plurality of objects that would allow the autonomous vehicle to perform the pull-out operation: determining whether communication can be established with an object among the plurality of objects; and based on a determination that communication can be established with the object, transmitting the first information to the object with which communication can be established.

In some implementations, the method further includes: based on the at least one object including a plurality of objects that block all of the at least one pull-out path including a plurality of pull-out paths, determining priority levels for the plurality of pull-out paths; and according to a descending order of the priority levels for the plurality of pull-out paths, and based on an association between the plurality of objects blocking the plurality of pull-out paths: determining whether communication can be established with an object among the plurality of objects; and based on a determination that communication can be established with the object, transmitting the first information to the object with which communication can be established.

In some implementations, the method further includes: based on the at least one object including a plurality of objects that block the at least one pull-out path, determining distances between the autonomous vehicle and the plurality of objects; and according to an ascending order of the distances between the autonomous vehicle and the plurality of objects: determining whether communication can be established with a first object among the plurality of objects; and based on a determination that communication can be established with the first object, transmitting the first information to the first object with which communication can be established.

In some implementations, the method further includes: based on the first object moving as a result of the transmission of the first information and the reception of the second information to and from the first object: determining whether communication can be established with a second object among the plurality of objects, according to the ascending order of the distances between the autonomous vehicle and the plurality of objects; and based on a determination that communication can be established with the second object, transmitting third information to the second object with which communication can be established.

In some implementations, the method further includes: based on a movement of the first object as a result of the transmission of the first information and the reception of the second information to and from the first object: generating a different pull-out path based on a condition that was modified by the movement of the first object.

The effects of the present invention are not limited to the above-described effects and other effects which are not described herein will become apparent to those skilled in the art from the following description.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that may include one or more processing devices and memory to store executable instructions to implement the stated functions.

The details of one or more implementations are set forth in the accompanying drawings and the description below. Other features will be apparent from the description and drawings, and from the claims. It is to be understood that both the foregoing general description and the following detailed description of the present disclosure are exemplary and explanatory and are intended to provide further explanation of the disclosure as claimed.

BRIEF DESCRIPTION OF THE DRAWINGS

FIG. 1 is a diagram illustrating an example of an external appearance of a vehicle according to an implementation of the present disclosure;

FIG. 20 is a diagram illustrating an example of securing a pull-out path of a vehicle according to a fourth implementation of the present disclosure; and FIGS. 21, 22, and 23 are diagrams illustrating examples of securing a pull-out path of a vehicle according to a fifth implementation of the present disclosure.

DETAILED DESCRIPTION

An autonomous vehicle may be configured to perform a pull-out operation that moves the vehicle out from a stationary state. For example, if the vehicle is in a parked state, then the pull-out operation may autonomously pull out the vehicle from the parked state. In such scenarios, the autonomous vehicle may generate one or more paths ("pull-out paths") along which the vehicle will move during the pull-out operation from the parked state. Such an autonomous (or semi-autonomous) pull-out operation may improve user convenience by automatically performing an appropriate movement to pull the vehicle out from a parked state.

However, difficulties may arise in scenarios where an obstacle blocks the generated pull-out path of the vehicle. Such obstacles may include, for example, another vehicle that is parked or stationary nearby. In such scenarios, the autonomous vehicle may not be able to properly perform a pull-out operation to leave from the parking state.

Implementations disclosed herein enable an autonomous vehicle to adaptively perform a pull-out operation from a stationary state (e.g., from a parking space) even in the presence of one or more objects (e.g., another vehicle) blocking a pull-out path. In some implementations, the autonomous vehicle may perform cooperative communication and control with the other vehicles (which may themselves be autonomous vehicles or manually-driven vehicles) that are blocking the pull-out path, so that the other vehicles may appropriately move to allow the autonomous vehicle to properly perform the pull-out path.

A vehicle as described in this disclosure may be any suitable type of motorized transportation device, such as an automobile or a motorcycle. Hereinafter, description will be given based on an example of an automobile.

A vehicle as described in this specification may be powered by any suitable source of power, and may include an internal combustion engine vehicle including an engine as a power source, a hybrid vehicle including both an engine and an electric motor as a power source, or an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 2:
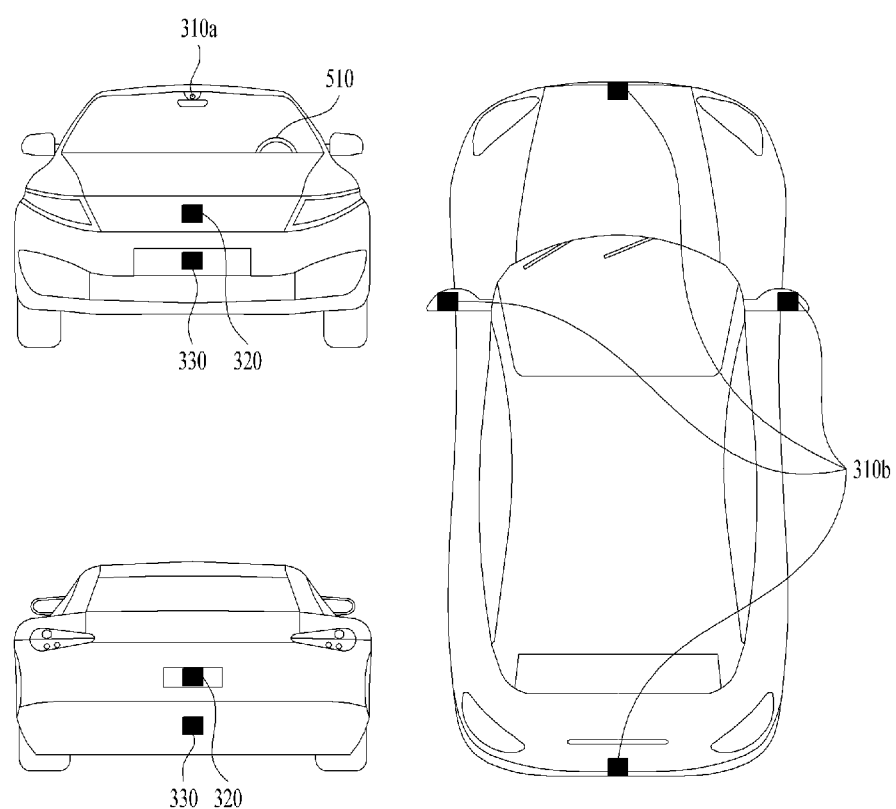
FIG. 2 is a diagram illustrating examples of different angled views of the external appearance of a vehicle according to an implementation of the present disclosure.
Figure 3:
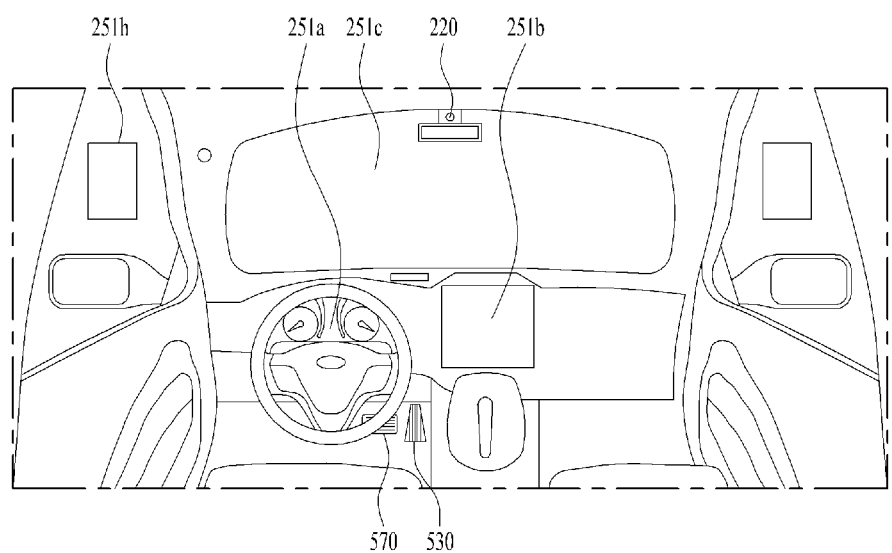
FIGS. 3 and 4 are diagrams illustrating examples of an interior configuration of a vehicle according to an implementation of the present disclosure.
Figure 4:
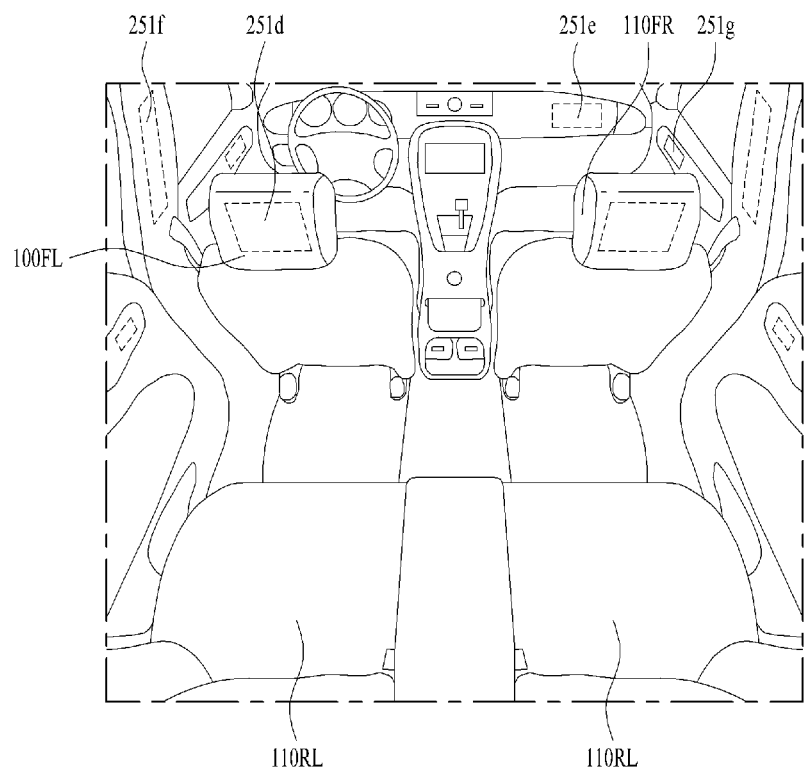
Figure 5:
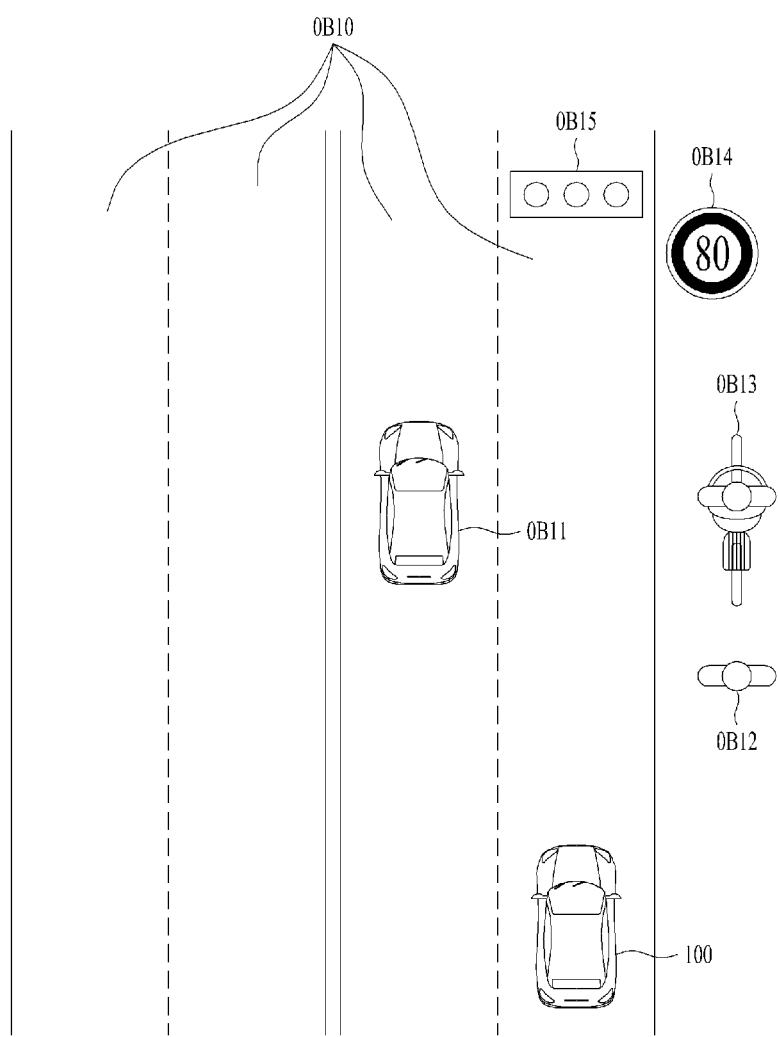
FIGS. 5 and 6 are diagrams illustrating examples of object detection according to an implementation of the present disclosure.
Figure 6:
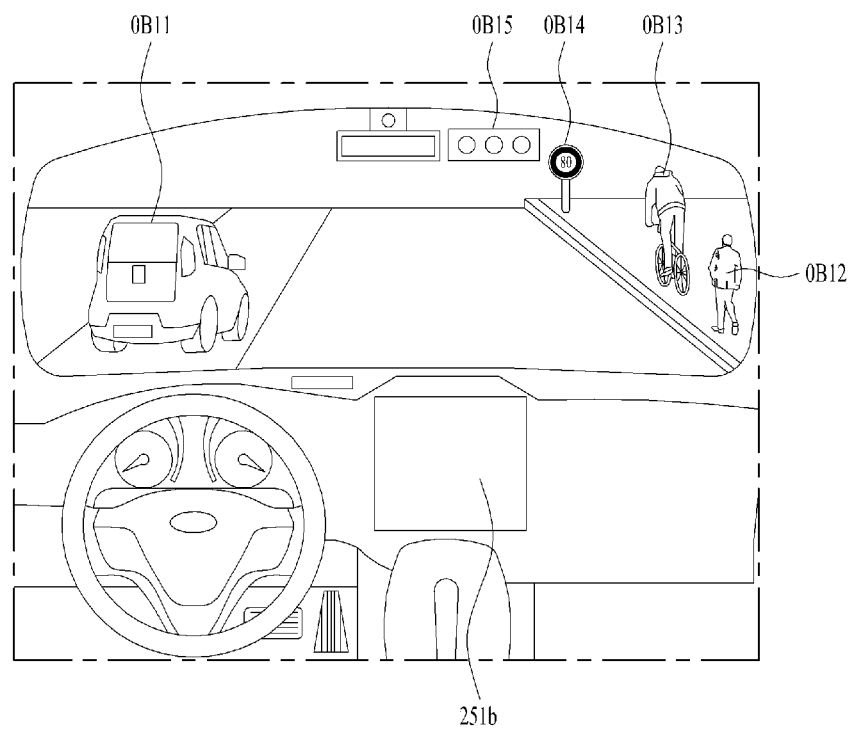
Figure 7:
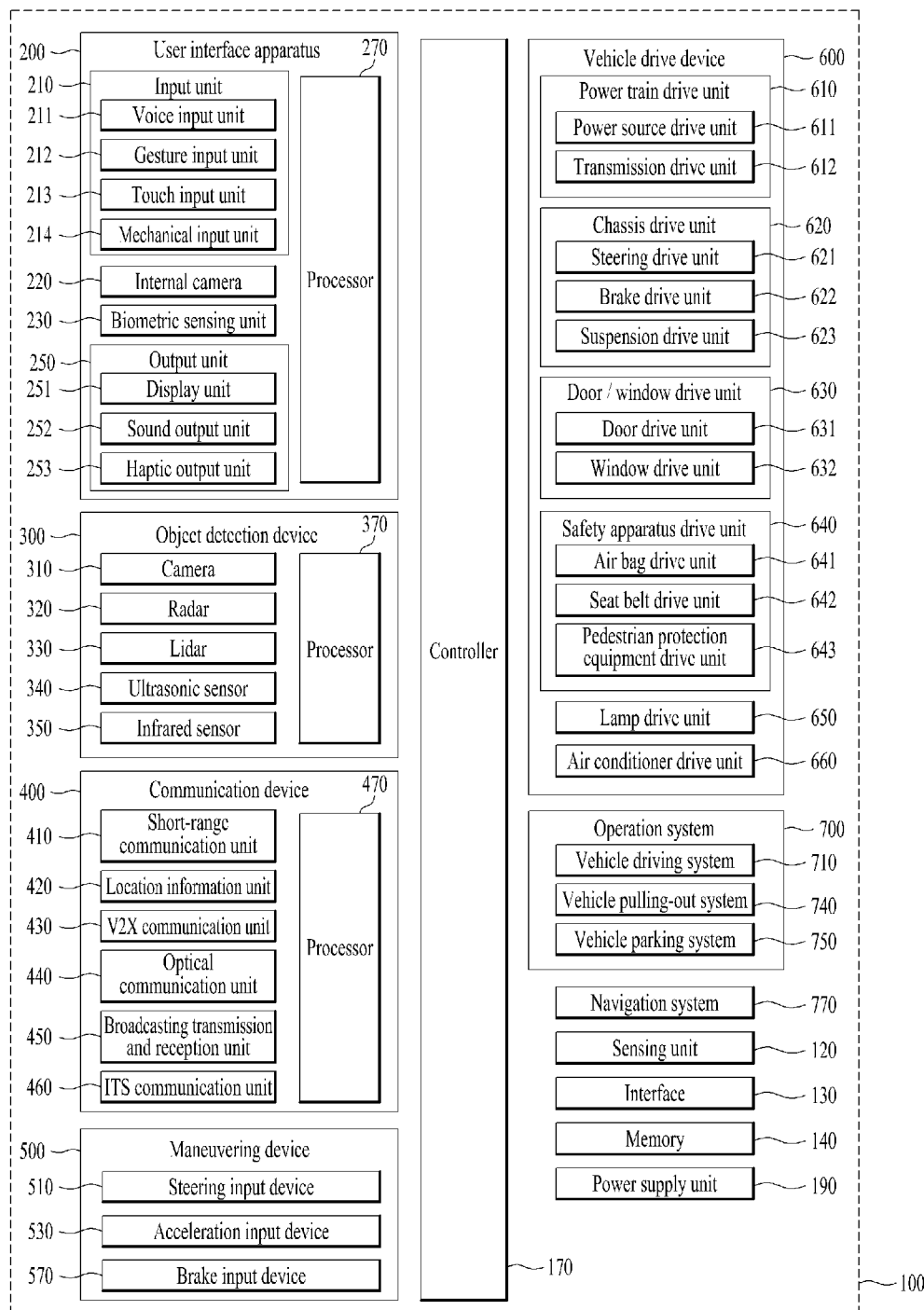
FIG. 7 is a block diagram illustrating an example of a vehicle according to an implementation of the present disclosure.

FIG. 1 is a view of the external appearance of a vehicle according to an implementation of the present disclosure, FIG. 2 is different angled views of a vehicle according to an implementation of the present disclosure, FIGS. 3 and 4 are views of the internal configuration of a vehicle according to an implementation of the present disclosure, FIGS. 5 and 6 are views for explanation of objects according to an implementation of the present disclosure, and FIG. 7 is a block diagram illustrating a vehicle according to an implementation of the present disclosure.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle. In some implementations, the vehicle 100 may be switched between an autonomous mode and a manual mode, either based on a user input or based on other factors.

For example, the vehicle 100 may be switched to an autonomous mode or a manual mode in response to a user input. For example, in response to a user input received through a user interface apparatus 200, the vehicle 100 may be switched from a manual mode to an autonomous mode, or vice versa.

As another example, the vehicle 100 may be switched to the autonomous mode or to the manual mode based on driving environment information. The driving environment information may include, for example, at least one of the following: information on an object outside a vehicle, navigation information, or vehicle state information.

The driving environment information may be obtained by various techniques. For example, the vehicle 100 may be switched from the manual mode to the autonomous mode, or vice versa, based on driving environment information generated by the object detection device 300. As another example, the vehicle 100 may be switched from the manual mode to the autonomous mode, or vice versa, based on driving environment information received through a communication device 400.

In some implementations, the vehicle 100 may be switched from the manual mode to the autonomous mode, or vice versa, based on information, data, and/or a signal provided from an external device.

When the vehicle 100 operates in the autonomous mode, the autonomous vehicle 100 may operate based on an operation system 700. For example, the autonomous vehicle 100 may operate based on information, data, and/or signals generated by a driving system 710, a vehicle pulling-out system 740, and a vehicle parking system 750.

While operating in the manual mode, the autonomous vehicle 100 may receive, for example through maneuvering device 500, a user input for driving of the vehicle 100. In response to the user input received, the vehicle 100 may operate in the manual mode.

The term "overall length" refers to the length from the front end to the rear end of the vehicle 100, the term "overall width" refers to the width of the vehicle 100, and the term "overall height" refers to the height from the bottom of the wheel to the roof. In the following description, the term "overall length direction L" refers to the reference direction for the measurement of the overall length of the vehicle 100, the term "overall width direction W" refers to the reference direction for the measurement of the overall width of the vehicle 100, and the term "overall height direction H" refers to the reference direction for the measurement of the overall height of the vehicle 100.

As illustrated in the example of FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, at least one processor such as controller 170, and a power supply unit 190.

In some implementations, the vehicle 100 may further include other components in addition to the aforementioned components, or may not include some of the aforementioned components.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor (e.g., the controller 170) included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include, for example, an input unit 210, an internal camera 220, a biometric sensing unit 230, an output unit 250, and at least one processor such as processor 270. Each component of the user interface device 200 may be separate from or integrated with the afore-described interface 130, structurally or functionally.

In some implementations, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window. The input unit 210 may include, for example, a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170. In some implementations, the voice input unit 211 may include one or more microphones.

The gesture input unit 212 may convert a gesture input of a user into an electrical signal. The converted electrical signal may be provided to the processor 270 or the controller 170. The gesture input unit 212 may include, for example, at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors. As an example, the gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170. The touch input unit 213 may include a touch sensor for sensing a touch input of a user. For example, in some implementations, the touch input unit 213 may be formed integral with a display unit 251 to implement a touch screen that provides an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170. The mechanical input unit 214 may be located, for example, on a steering wheel, a center fascia, a center console, a cockpit module, a door, etc.

In some scenarios, the vehicle 100 may implement a learning mode in response to a user input obtained through at least one of the afore-described voice input unit 211, gesture input unit 212, touch input unit 213, or mechanical input unit 214. In the learning mode, the vehicle 100 may implement one or more machine-learning techniques to learn various aspects related to the vehicle 100, such as a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. In some implementations, the processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire, for example, finger print information, heart rate information, etc. of the user. The biometric information may be used for user authentication.

The output unit 250 may be configured to generate a visual, audio, and/or tactile output. The output unit 250 may include, for example, at least one selected from among a display unit 251, a sound output unit 252, and a haptic output unit 253.

The display unit 251 may display graphic objects corresponding to various types of information. The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen. As an example, the display unit 251 may be implemented as a Head Up Display (HUD). When implemented as a HUD, the display unit 251 may include a projector module in order to output information through an image projected on a windshield or a window.

In some implementations, the display unit 251 may include a transparent display. For example, the transparent display may be attached on the windshield or a window of the vehicle 100. In some scenarios, the transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface device 200 may include a plurality of display units 251a to 251g. The display units may be disposed in various regions in the vehicle, such as a region of a steering wheel, a region of an instrument panel (e.g., displays 251a, 251b or 251e), a region of a seat (e.g., display 251d), a region of a pillar (e.g., display 251f), a region of a door (e.g., display 251g), a region of a center console, a region of a head lining, a region of a sun visor, a region of a windshield (e.g., display 251c), or a region of a window (e.g., display 251h).

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

At least one processor, such as processor 270, may control the overall operation of each unit of the user interface device 200. In some implementations, the user interface device 200 may include a plurality of processors 270 or may not include the processor 270.

In a case where the user interface device 200 does not include the processor 270, the user interface device 200 may operate under control of the controller 170 or at least one processor of a different device inside the vehicle 100.

In some implementations, the user interface device 200 may be implemented as a display device for vehicle. The user interface device 200 may operate under control of the controller 170.

The object detection device 300 may be used to detect an object outside the vehicle 100. For example, the object detection device 300 may generate object information based on sensing data. The object information may include information about the presence of an object, location information of the object, information on distance between the vehicle and the object, and the speed of the object relative to the vehicle 100.

The object detected by the object detection device 300 may be various types of objects related to travelling of the vehicle 100.

Referring to FIGS. 5 and 6, various types of objects that may be detected by the object detection device 300 are illustrated. For example, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

As an example, an object detected by the object detection device 300 may be a lane OB10, such as a lane in which the vehicle 100 is traveling (hereinafter, referred to as the current driving lane), or a lane next to the current driving lane, or a lane in which a vehicle travelling in the opposite direction is travelling. In some scenarios, the lane OB10 may include left and right lines that define the lane.

As another example, an object detected by the object detection device 300 may be a nearby vehicle OB11, which may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

As another example, an object detected by the object detection device 300 may be a pedestrian OB12, which may be a person in the vicinity of the vehicle 100. The pedestrian OB12 may be a person within a predetermined distance from the vehicle 100. For example, the pedestrian OB12 may be a person on a sidewalk or on the roadway.

As another example, an object detected by the object detection device 300 may be a two-wheeled vehicle OB13, such as a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bicycle on a sidewalk or the roadway.

As another example, an object detected by the object detection device 300 may be a traffic control indicator, such as a traffic light OB15, a traffic sign plate OB14, or a pattern or text painted on a road surface.

As another example, an object detected by the object detection device 300 may be light outside the vehicle, such as light generated by a lamp in the nearby vehicle, or light generated by a street light, or solar light.

As another example, an object detected by the object detection device 300 may be a road, such as a road surface, a curve, and slopes, such as an upward slope and a downward slope.

As another example, an object detected by the object detection device 300 may be a structure, such as a structural body located around the road in the state of being fixed onto the ground. For example, the structure may be a streetlight, a roadside tree, a building, a traffic light, and a bridge.

As another example, an object detected by the object detection device 300 may be a geographical feature, such as a mountain or a hill.

In some implementations, the object detected by the object detection device 300 may be classified as a movable object or a stationary object. For example, the movable object may include a nearby vehicle and a pedestrian. For example, the stationary object may include a traffic signal, a road, and a structure.

The object detection device 300 may include one or more sensors to detect the various types of objects, such as a camera 310, a radar 320, a lidar 330, an ultrasonic sensor 340, or an infrared sensor 350. The object detection device 300 may also include at least one processor such as processor 370. Each component of the object detection device 300 may be separate from or integrated with the sensing unit 120, structurally or functionally.

In some implementations, the object detection device 300 may further include other components in addition to the aforementioned components, or may not include some of the aforementioned components.

As an example of the object detection device 300, the camera 310 may be located at an appropriate position outside the vehicle 100 and acquire images of the outside of the vehicle 100. The camera 310 may be, for example, a mono camera, a stereo camera 310*a*, an Around View Monitoring (AVM) camera 310*b*, or a 360-degree camera.

At least one processor, which may part of the camera 310 or otherwise communicative with the camera, may process the images (e.g., using image processing algorithms) and acquire various types of information regarding an object, for example, location information of an object, information on distance to the object, and information on speed relative to the object.

For example, the camera 310 may acquire information regarding a distance to the object and/or information regarding a speed relative to the object based on analyzing a change in size of the object over time in acquired images.

As another example, the camera 310 may acquire the information regarding distance to the object and/or the information regarding speed relative to the object by utilizing a pin-hole model or by profiling a road surface.

As another example, the camera 310 may acquire the information regarding distance to the object and/or the information regarding the speed relative to the object, based on information on disparity of stereo images acquired by a stereo camera 310*a*.

In some implementations, the camera 310 may be disposed near a front windshield in the vehicle 100 and acquire images of the front of the vehicle 100. Alternatively, the camera 310 may be disposed around a front bumper or a radiator grill.

In some implementations, the camera 310 may be disposed near a rear glass in the vehicle 100 and acquire images of the rear of the vehicle 100. Alternatively, the camera 310 may be disposed around a rear bumper, a trunk, or a tailgate.

In some implementations, the camera 310 may be disposed near at least one of the side windows in the vehicle 100 and acquire images of the side of the vehicle 100. Alternatively, the camera 310 may be disposed around a side mirror, a fender, or a door.

In some scenarios, the camera 310 may provide an acquired image to at least one processor, such as processor 370.

As another example of the object detection device 300, the radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

As another example of the object detection device 300, the lidar 330 may include a laser transmission unit and a laser reception unit. The lidar 330 may be implemented by the TOF scheme or the phase-shift scheme.

The lidar 330 may be implemented as a drive type lidar or a non-drive type lidar. When implemented as the drive type lidar, the lidar 330 may rotate by a motor and detect an object in the vicinity of the vehicle 100. When implemented as the non-drive type lidar, the lidar 330 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

As a further example of the object detection device 300, the ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

As yet another example of the object detection device 300, the infrared sensor 350 may include an infrared light transmission unit and an infrared light reception unit. The infrared sensor 350 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

In some implementations, at least one processor, such as processor 370, may control the overall operation of the object detection device 300 and/or process data and information acquired by the object detection device 300.

For example, the processor 370 may detect or classify an object that is sensed by object detection device 300 (e.g., the camera 310, the radar 320, the lidar 330, the ultrasonic sensor 340, or the infrared sensor 350). For example, the processor 370 may compare data that is sensed by the object detection device 300 with pre-stored data. In some implementations, the processor 370 may implement one or more machine-learning techniques to detect or classify an object.

As another example, the processor 370 may detect and track an object based on acquired images. The processor 370 may, for example, calculate the distance to the object and the speed relative to the object.

As yet another example, the processor 370 may acquire information regarding the distance to the object and/or information regarding the speed relative to the object based on a variation in size over time of the object in acquired images.

As a further example, the processor 370 may acquire information regarding the distance to the object and/or information regarding the speed relative to the object by employing a pin-hole model or by profiling a road surface.

As yet another example, the processor 370 may acquire information regarding the distance to the object and/or information regarding the speed relative to the object based on information on disparity of stereo images acquired from the stereo camera 310a.

In some implementations, the processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

In some implementations, the processor 370 may detect and track an object based on a reflection laser light which is formed as a result of reflection of transmission laser by the object. Based on the laser light, the processor 370 may, for example, calculate the distance to the object and the speed relative to the object.

In some implementations, the processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

In some implementations, the processor 370 may detect and track an object based on reflection infrared light which is formed as a result of reflection of transmission infrared light by the object. Based on the infrared light, the processor 370 may, for example, calculate the distance to the object and the speed relative to the object.

As previously described, above, in some implementations the vehicle 100 may implement a learning mode, for example in response to a user input to the input unit 210, to implement one or more machine-learning techniques. In such scenarios, the processor 370 may store in computer memory, such as in the memory 140, various types of data that is sensed by the object detection device 300, such as the camera 310, the radar 320, the lidar 330, the ultrasonic sensor 340, and/or the infrared sensor 350. The one or more machine-learning techniques may utilize such stored data, and results of the machine-learning may be utilized in an operating mode of the vehicle 100, as will be further described below in relation to the operation system 700.

According to an implementation, the object detection device 300 may include at least one processor, such as processor 370, or no processor. For example, the camera 310, the radar 320, the lidar 330, the ultrasonic sensor 340, and the infrared sensor 350 may include individual processors.

In a case where the object detection device 300 does not include the processor 370, the object detection device 300 may operate under control of the controller 170 or at least one other processor inside the vehicle 100.

In some implementations, the communication device 400 is configured to perform communication with an external device. Here, the external device may be a nearby vehicle, a mobile terminal, or a server. To perform communication, the communication device 400 may include at least one selected from among a transmission antenna, a reception antenna, a Radio Frequency (RF) circuit configured to implement various communication protocols, and an RF device.

As examples, the communication device 400 may include a short-range communication unit 410, a location information unit 420, a V2X communication unit 430, an optical communication unit 440, a broadcast transmission and reception unit 450, an Intelligent Transport Systems (ITS) communication unit 460, and at least one processor such as processor 470.

In some implementations, the communication device 400 may further include other components in addition to the aforementioned components, or may not include some of the aforementioned components.

In some implementations, the short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus). The short-range communication unit 410 may be configured to establish connections with wireless area networks to perform short-range communication between the vehicle 100 and at least one external device.

In some implementations, the location information unit 420 is configured to acquire location information of the vehicle 100. For example, the location information unit 420 may include a Global Positioning System (GPS) module or a Differential Global Positioning System (DGPS) module.

In some implementations, the V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

In some implementations, the optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal. As an example, the light emitting unit may be integrally formed with a lamp provided included in the vehicle 100.

In some implementations, the broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

In some implementations, the ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

At least one processor, such as processor 470, may control the overall operation of each unit of the communication device 400. In some implementations, the communication device 400 may include a plurality of processors, or may not include a processor. In scenarios where the communication device 400 does not include the processor 470, the communication device 400 may operate under control of the controller 170 or at least one other processor of a device inside of the vehicle 100.

In some implementations, the communication device 400 may implement a vehicle display device, together with the user interface device 200. In this case, the vehicle display device may be referred to as a telematics device or an Audio Video Navigation (AVN) device. The communication device 400 may operate under control of at least one processor, such as controller 170.

In some implementations, the maneuvering device 500 is configured to receive a user input for driving the vehicle 100. In the manual mode, the vehicle 100 may operate based on a signal provided by the maneuvering device 500. The maneuvering device 500 may include, for example, a steering input device 510, an acceleration input device 530, and/or a brake input device 570.

As an example of the maneuvering device 500, the steering input device 510 may receive a user input with regard to the direction of travel of the vehicle 100. The steering input device 510 may take the form of a wheel to enable a steering input through the rotation thereof. In some implementations, the steering input device may be provided as a touchscreen, a touch pad, or a button.

As another example of the maneuvering device 500, the acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The maneuvering device 500 may operate under control of at least one processor, such as controller 170.

In some implementations, the vehicle drive device 600 is configured to electrically control the operation of various devices of the vehicle 100. The vehicle drive device 600 may include, for example, a power train drive unit 610, a chassis drive unit 620, a door/window drive unit 630, a safety apparatus drive unit 640, a lamp drive unit 650, and/or an air conditioner drive unit 660. In some implementations, the vehicle drive device 600 may further include other components in addition to the aforementioned components, or may not include some of the aforementioned components.

In some implementations, the vehicle drive device 600 may include at least one processor. Each unit of the vehicle drive device 600 may include its own processor.

As an example of the vehicle drive device 600, the power train drive unit 610 may control the operation of a power train. The power train drive unit 610 may include a power source drive unit 611 and a transmission drive unit 612.

In this example, the power source drive unit 611 may control a power source of the vehicle 100. In the case in which a fossil fuel-based engine is the power source, the power source drive unit 611 may perform electronic control of the engine. As such the power source drive unit 611 may control, for example, the output torque of the engine. The power source drive unit 611 may adjust the output torque of the engine under control of at least one processor such as controller 170. In a case where an electric motor is the power source, the power source drive unit 611 may control the motor. The power source drive unit 611 may control, for example, the RPM and toque of the motor under control of at least one processor, such as controller 170.

Also in this example, the transmission drive unit 612 may control a transmission. The transmission drive unit 612 may adjust the state of the transmission. The transmission drive unit 612 may adjust a state of the transmission to a drive (D), reverse (R), neutral (N), or park (P) state. In some implementations, in a case where an engine is the power source, the transmission drive unit 612 may adjust a gear-engaged state to the drive position D.

As another example of the vehicle drive device 600, the chassis drive unit 620 may control the operation of a chassis. The chassis drive unit 620 may include a steering drive unit 621, a brake drive unit 622, and a suspension drive unit 623.

In this example, the steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel. In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100. In some implementations, the suspension drive unit 623 may control a plurality of suspensions individually.

As another example of the vehicle drive device 600, the door/window drive unit 630 may perform electronic control of a door apparatus or a window apparatus inside the vehicle 100. The door/window drive unit 630 may include a door drive unit 631 and a window drive unit 632.

In this example, the door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

As yet another example of the vehicle drive device 600, the safety apparatus drive unit 640 may perform electronic control of various safety apparatuses provided inside the vehicle 100. The safety apparatus drive unit 640 may include an airbag drive unit 641, a safety belt drive unit 642, and a pedestrian protection equipment drive unit 643.

In this example, the airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

As yet a further example of the vehicle drive device 600, the lamp drive unit 650 may perform electronic control of various lamp apparatuses provided inside the vehicle 100.

As another example of the vehicle drive device 600, the air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

In some implementations, the vehicle drive device 600 may include at least one processor. For example, tach unit of the vehicle drive device 600 may include its own processor(s). In some implementations, the vehicle drive device 600 may operate under control of the controller 170.

The vehicle 100 may also include operation system 700, which is a system for controlling the overall driving operation of the vehicle 100. The operation system 700 may operate in the autonomous driving mode. The operation system 700 may include the driving system 710, the vehicle pulling-out system 740, and the vehicle parking system 750. In some implementations, the operation system 700 may further include other components in addition to the aforementioned components, or may not include some of the aforementioned component.

In some implementations, the operation system 700 may include at least one processor. For example, each unit of the operation system 700 may include its own processor(s).

In some implementations, the operation system 700 may control operations of the vehicle 100 based on machine-learning. In this case, the vehicle 100 may perform a learning mode and may perform an operating mode based on results of the learning mode. In some scenarios, some degree or additional learning may be performed during the operation mode, for example, to further refine or improve the results of machine-learning based on operation feedback while the vehicle 100 operates in the operating mode.

For example, the vehicle 100 may perform a learning mode to learn information about a vehicle's driving conditions or environment, and then use the results of the learning mode to perform an operation of autonomous driving for the vehicle 100. A description will be given below of an example of the learning mode and the operating mode performed by the processor(s) of the operation system 700.

In some implementations, the learning mode may be performed during manual driving of the vehicle 100. In scenarios where the learning mode is performed during manual driving, the machine-learning techniques may perform learning that is tailored to specific driving scenarios as the vehicle 100 is manually driven. In the learning mode, at least one processor of the vehicle (e.g., in the operation system 700) may utilize machine-learning techniques to learn various types of information, such as a driving route and/or ambient environment, regarding driving of the vehicle 100.

As an example, machine-learning of the driving route may include generating map data for a route in which the vehicle 100 drives. Particularly, the processor of the operation system 700 may generate map data based on information detected through the object detection device 300 during driving from a departure to a destination.

As another example, machine-learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

Results of the learning mode may then be utilized by the vehicle 100 during an operating mode. For example, the operating mode may include an autonomous driving mode or a semi-autonomous driving mode of the vehicle 100. The operating mode described herein is described as being implemented based on results of machine-learning (e.g., machine-learning the driving route or the ambient environment) that were learned during the learning mode. However, in some implementations, additional learning may be implemented during the operating mode, for example to further refine or update the results of the learning mode based on feedback while the vehicle 100 operates in the operating mode.

In some implementations, the operating mode may be performed in response to a user input through the input unit 210, or when the vehicle 100 reaches the learned driving route and parking space, the operating mode may be performed automatically.

In some scenarios, the operating mode may include a semi-autonomous operating mode that involves some degree of user manipulations of the maneuvering device 500, or may include a fully-autonomous operating mode that involves no user manipulation of the maneuvering device 500.

As an example, during the operating mode, the at least one processor of the operation system 700 may control a driving of the vehicle 100 along a learned driving route, for example by controlling the driving system 710.

As another example, during the operating mode, the at least one processor of the operation system 700 may control a pull-out of the vehicle 100 from a learned parking space, for example by controlling the vehicle pulling-out system 740.

As yet another example, during the operating mode, the at least one processor of the operation system 700 may control a parking of the vehicle 100 in a learned parking space, for example by controlling the vehicle parking system 750.

In some implementations, in a case where the operation system 700 is implemented as software, the operation system 700 may be implemented by the controller 170.

In some implementations, the operation system 700 may include at least one selected from among the user interface device 200, the object detection device 300, the communication device 400, the vehicle drive device 600, and the controller 170.

The driving system 710 may perform driving of the vehicle 100. For example, the driving system 710 may perform driving of the vehicle 100 by providing a control signal to the vehicle drive device 600 in response to reception of navigation information from the navigation system 770. As another example, the driving system 710 may perform driving of the vehicle 100 by providing a control signal to the vehicle drive device 600 in response to reception of object information from the object detection device 300. As yet another example, the driving system 710 may perform driving of the vehicle 100 by providing a control signal to the vehicle drive device 600 in response to reception of a signal from an external device through the communication device 400.

In general, the driving system 710 may include one or more systems or components that performs driving of the vehicle 100, and may include, for example, at least one of the user interface device 200, the object detection device 300, the communication device 400, the maneuvering device 500, the vehicle drive device 600, the navigation system 770, the sensing unit 120, or the controller 170. In some scenarios, the driving system 710 may be referred to as a vehicle driving control device.

The vehicle pulling-out system 740 may perform an operation of pulling the vehicle 100 out of a parking space. For example, the vehicle pulling-out system 740 may perform an operation of pulling the vehicle 100 out of a parking space, by providing a control signal to the vehicle drive device 600 in response to reception of navigation information from the navigation system 770. As another example, the vehicle pulling-out system 740 may perform an operation of pulling the vehicle 100 out of a parking space, by providing a control signal to the vehicle drive device 600 in response to reception of object information from the object detection device 300. As yet another example, the vehicle pulling-out system 740 may perform an operation of pulling the vehicle 100 out of a parking space, by providing a control signal to the vehicle drive device 600 in response to reception of a signal from an external device.

In general, the vehicle pulling-out system 740 may include one or more systems or components that perform a pulling-out operation of the vehicle 100, and may include, for example, at least one of the user interface device 200, the object detection device 300, the communication device 400, the maneuvering device 500, the vehicle drive device 600, the navigation system 770, the sensing unit 120, or the controller 170. In some scenarios, the vehicle pulling-out system 740 may be referred to as a vehicle pulling-out control device.

The vehicle parking system 750 may perform an operation of parking the vehicle 100 in a parking space. For example, the vehicle parking system 750 may perform an operation of parking the vehicle 100 in a parking space, by providing a control signal to the vehicle drive device 600 in response to reception of navigation information from the navigation system 770. As another example, the vehicle parking system 750 may perform an operation of parking the vehicle 100 in a parking space, by providing a control signal to the vehicle drive device 600 in response to reception of object information from the object detection device 300. As yet another example, the vehicle parking system 750 may perform an operation of parking the vehicle 100 in a parking space, by providing a control signal to the vehicle drive device 600 in response to reception of a signal from an external device.

In general, the vehicle parking system 750 may include one or more systems or components that perform a parking operation of the vehicle 100, and may include, for example, at least one of the user interface device 200, the object detection device 300, the communication device 400, the maneuvering device 500, the vehicle drive device 600, the navigation system 770, the sensing unit 120, or the controller 170. In some scenarios, the vehicle parking system 750 may be referred to as a vehicle parking control device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and at least one processor. The memory may store navigation information, and the processor(s) may control the operation of the navigation system 770. In some implementations, the navigation system 770 may update pre-stored information by receiving information from an external device through the communication device 400. In some implementations, the navigation system 770 may be implemented as part of the user interface device 200.

Implementation 1

FIGS. 8 to 11 are views illustrating a method of securing a pull-out path of a vehicle according to an implementation of the present disclosure. In the following description, it may be understood that at least one processor of the vehicle 100, as described below, may be implemented by the controller 170 illustrated in FIG. 7. Further, an object, as described below, may include various types of objects, including another vehicle.

Figure 8:
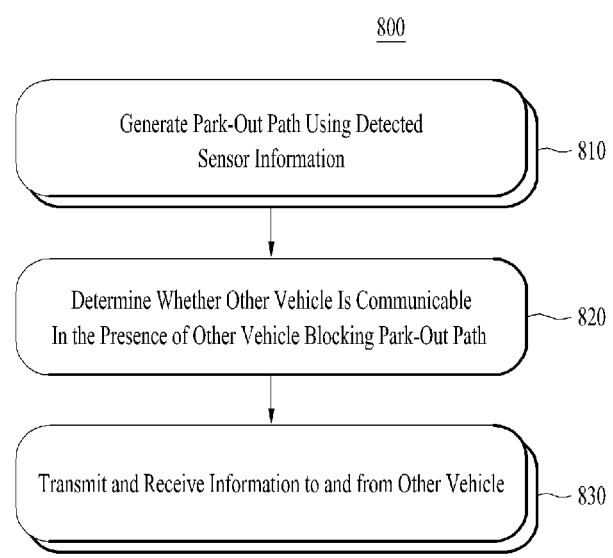
FIGS. 8 to 11 are diagrams illustrating examples of securing a pull-out path of a vehicle according to a first implementation of the present disclosure.
Figure 9:
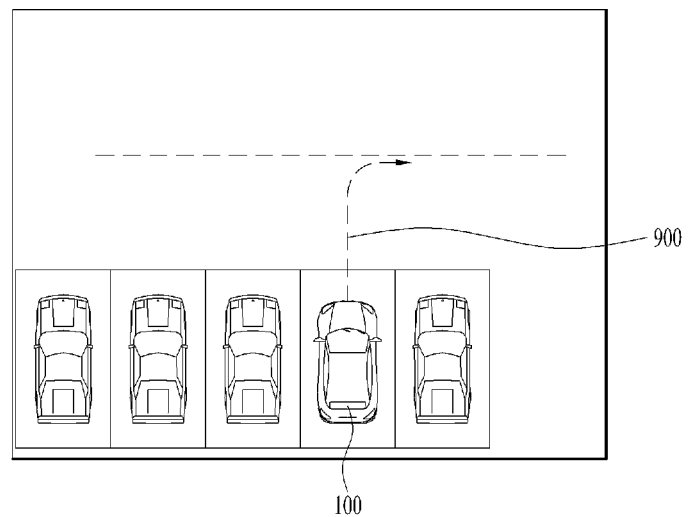

FIGS. 8 and 9 are views illustrating a method of securing a pull-out path by the vehicle 100 in the absence of any other vehicle blocking pull-out of the vehicle 100. In step 810 of FIG. 8, the processor of the vehicle 100 generates a pull-out path of the vehicle 100, using detected sensor information.

The sensor information may be detected through the object detection device 300. The object detection device 300 including the camera 310, the radar 320, the lidar 330, the ultrasonic sensor 340, and the infrared sensor 350 may detect an object within a predetermined distance from the vehicle 100. The processor of the vehicle 100 generates at least one pull-out path using the detected object.

FIG. 9 is a plan view illustrating generation of a pull-out path 900 by the processor of the vehicle 100 according to the first implementation of the present disclosure. As illustrated in FIG. 9, since there is no other vehicle blocking pull-out of the vehicle 100, the processor may pull out the vehicle 100 from a parking space along the generated pull-out path 900.

Figure 10:
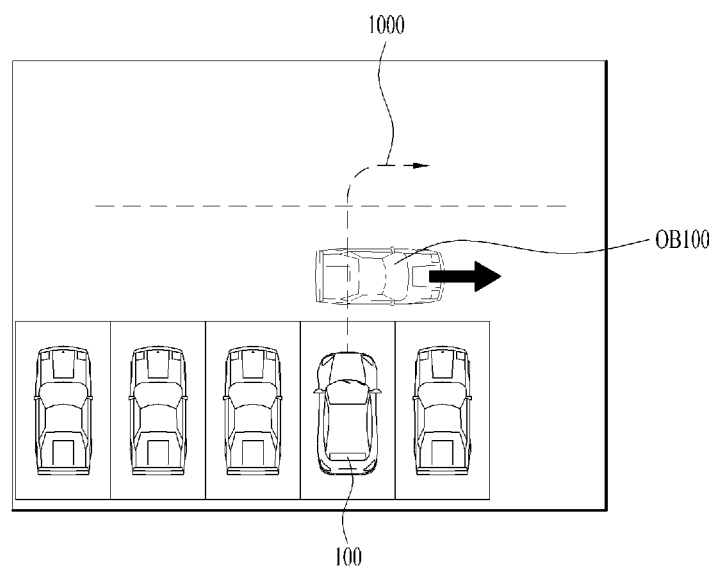
Figure 11:
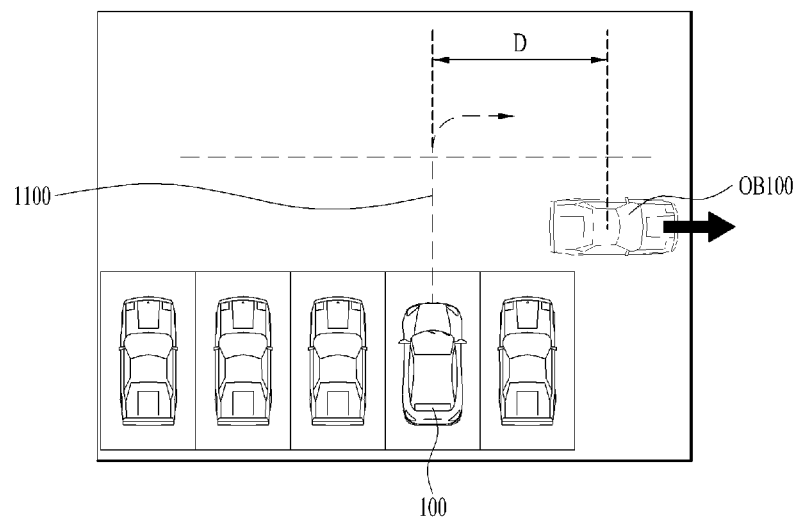

In contrast, FIGS. 10 and 11 are views illustrating a method of securing a pull-out path by transmitting and receiving information to and from one other vehicle OB100, in the presence of the other vehicle OB100 blocking pull-out of the vehicle 100 according to the first implementation of the present disclosure.

Referring to FIG. 10, it may occur that the other vehicle OB100 has been parked in a pull-out path 1000 generated by the processor of the vehicle 100 and thus the vehicle 100 is not capable of pulling out of a parking space. Herein, the processor of the vehicle 100 determines whether it can communicate with the other vehicle OB100 blocking the pull-out path 1000 in step 820 of FIG. 8.

To determine whether the other vehicle OB100 is communicable, the processor of the vehicle 100 may use the short-range communication unit 410, the V2X communication unit 430, the optical communication unit 440, and so on.

When the other vehicle OB100 is a communication-enabled vehicle, the processor of the vehicle 100 transmits and receives information to and from the other vehicle OB100. The information may include information about movement of the other vehicle OB100 for pull-out of the vehicle 100.

More specifically, the processor of the vehicle 100 calculates a movement direction and a movement distance D for the other vehicle OB100 that would allow the vehicle 100 to pull out of the parking space. Subsequently, the vehicle 100 transmits a movement request signal including information about the calculated movement direction and movement distance D to the other vehicle OB100 in step 830 of FIG. 8.

When the other vehicle OB100 moves based on the received information about the movement direction and movement distance D, the processor of the vehicle 100 pulls out the vehicle 100 along a pull-out path 1100 from the parking space, as illustrated in FIG. 11.

According to another example of the first implementation of the present disclosure, the vehicle 100 may transmit data detected through the object detection device 300 to the other vehicle OB100 without calculating and transmitting a movement direction and a movement distance D. In such scenarios, the data that is transmitted to the other vehicle OB100 may include information regarding how much the other vehicle OB100 blocks the pull-out path of the vehicle 100, such as an image captured by the camera 310, a distance between the vehicle 100 and the other vehicle OB100, sensed by the ultrasonic sensor 340, and so on. Upon receipt of the data, the other vehicle OB100 may calculate the movement direction and movement distance D, and move on its own based on the calculation result.

Implementation 2

FIGS. 12 to 16 are views illustrating a method of securing a pull-out path of a vehicle according to another implementation of the present disclosure. In the following description, it may be understood that at least one processor of the vehicle 100, as described below, may be implemented by the controller 170 illustrated in FIG. 7. Further, an object, as described below, may include various types of objects, including another vehicle.

Figure 12:
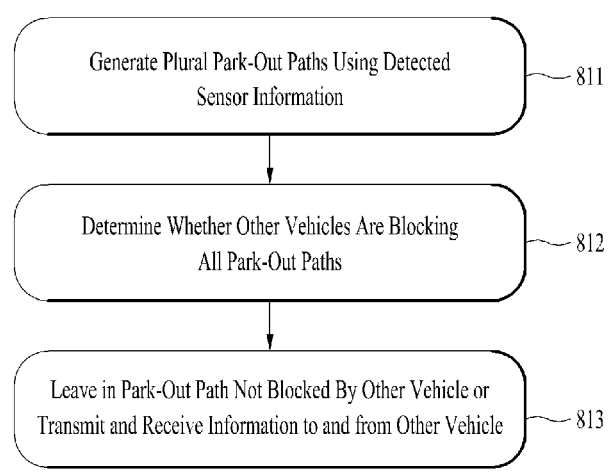
FIGS. 12 to 16 are diagrams illustrating examples of securing a pull-out path of a vehicle according to a second implementation of the present disclosure.
Figure 13:
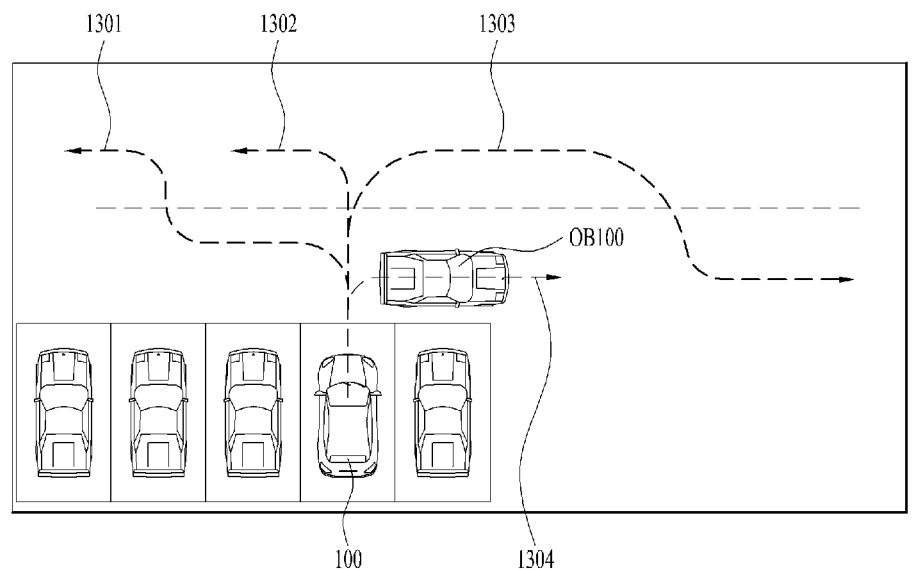
Figure 14:
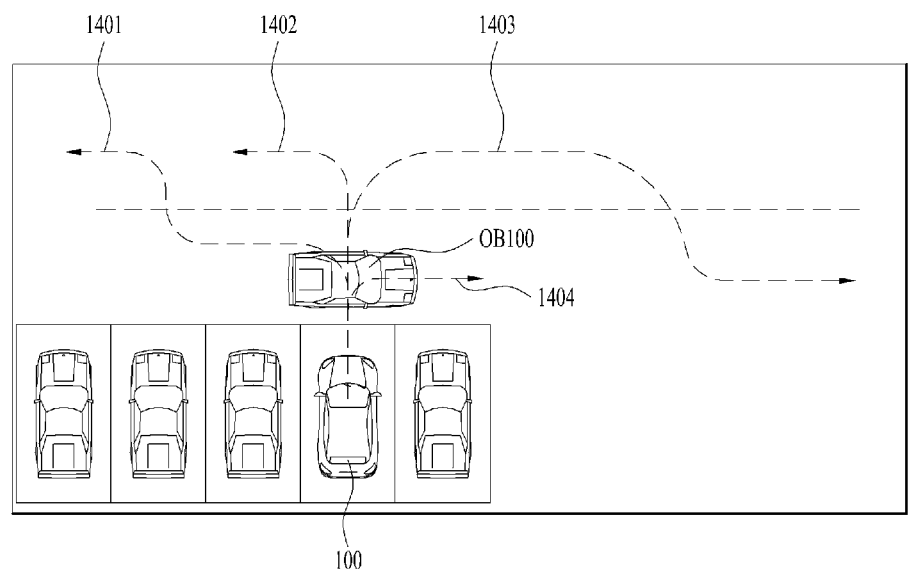
Figure 15:
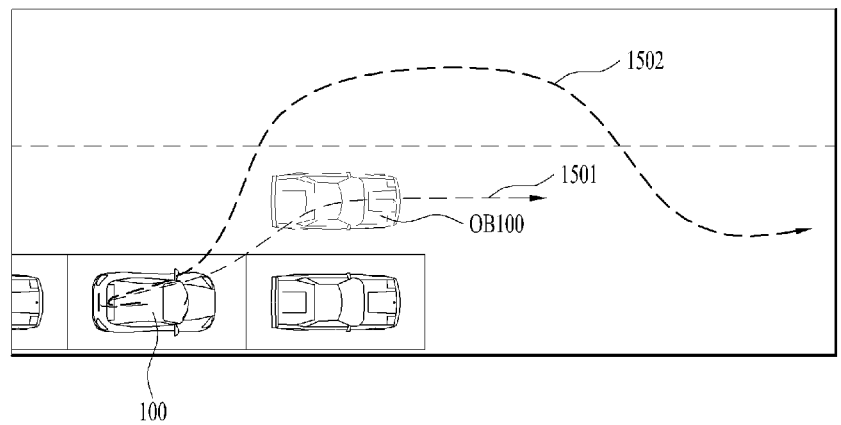
Figure 16:
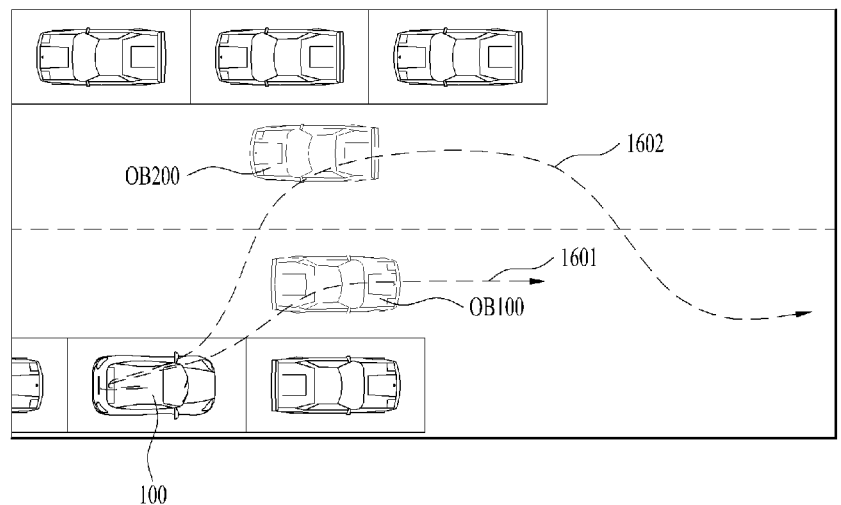

FIG. 12 is a flowchart illustrating a method of securing a pull-out path of the vehicle 100 according to the second implementation of the present disclosure. It may be understood that steps 811, 812, and 813 of FIG. 12 are included in step 810 of FIG. 8. In step 811 of FIG. 12, the processor of the vehicle 100 may generate a plurality of pull-out paths, using detected sensor information. FIGS. 13 and 14 illustrate the vehicle 100 which has been perpendicularly parked, and FIGS. 15 and 16 illustrate the vehicle 100 which has been parallel parked.

FIG. 13 is a plan view illustrating generation of a plurality of pull-out paths by the processor of the perpendicularly parked vehicle 100 according to the second implementation of the present disclosure. As illustrated in the example of FIG. 13, the processor of the vehicle 100 generates a plurality of pull-out paths including first to fourth pull-out paths 1301 to 1304 (although implementations are not limited to any particular number of pull-out paths). Subsequently, the processor of the vehicle 100 determines whether the other vehicle OB100 blocks all of the pull-out paths (e.g., all of the first to fourth pull-out paths) in step 812 of FIG. 12.

FIG. 13 illustrates a case in which the other vehicle OB100 blocks only the fourth pull-out path 1304, and the vehicle 100 may pull out of a parking space along one of the first, second, and third pull-out paths 1301, 1302, and 1303. In this case, the processor of the vehicle 100 pulls the vehicle 100 out of the parking space along one of the first, second, and third pull-out paths 1301, 1302, and 1303 which are not blocked by the other vehicle OB100, without transmitting and receiving information to and from the other vehicle OB100.

In contrast, FIG. 14 is a view illustrating a case in which the other vehicle OB100 blocks all of the first to fourth pull-out paths 1301 to 1304. Unlike FIG. 13, the other vehicle OB100 blocks all of the first to fourth pull-out paths 1301 to 1304 in FIG. 14. Therefore, the processor of the vehicle 100 transmits and receives information to and from the other vehicle OB100. The operation of transmitting and receiving information to and from the other vehicle OB100 may be performed in the same manner as step 830 of FIG. 8.

FIG. 15 is a plan view illustrating generation of a plurality of pull-out paths by the processor of the parallel parked vehicle 100 according to the second implementation of the present disclosure. In FIG. 15, since the other vehicle OB100 blocks only a first pull-out path 1501, the processor of the vehicle 100 pulls the vehicle 100 out of a parking space along a second pull-out path 1502 which is not blocked by the other vehicle OB100, without transmitting and receiving information to and from the other vehicle OB100.

In contrast, FIG. 16 is a view illustrating a case in which there are a plurality of other vehicles, blocking all of a plurality of generated pull-out paths. That is, since the first other vehicle OB100 blocks a first pull-out path 1601 and a second other vehicle OB200 blocks a second pull-out path 1602, the vehicle 100 may not pull out of a parking space.

In this case, the processor of the vehicle 100 transmits and receives information to and from at least one of the first other vehicle OB100 or the second other vehicle OB200. The operation of transmitting and receiving information to and from at least one of the first other vehicle OB100 or the second other vehicle OB200 may be performed in the same manner as step 830 of FIG. 8.

In some implementations, the processor of the vehicle 100 may perform the operation of transmitting and receiving information to and from at least one of the first other vehicle OB100 or the second other vehicle OB200 in the following two methods.

One of the methods is that the processor of the vehicle 100 determines whether each of the plurality of other vehicles is capable of communicating with the vehicle 100. The processor of the vehicle 100 transmits and receives information to and from another vehicle in an ascending order of movement distances required for pull-out of the vehicle 100, among the plurality of other vehicles.

For example, when both the first and second other vehicles OB100 and OB200 are capable of communicating with the vehicle 100 and the first other vehicle OB100 is required to move for a shorter distance than the second other vehicle OB200, for pull-out of the vehicle 100, the processor of the vehicle 100 transmits and receives information to and from the first other vehicle OB100 with priority.

The other method is that the processor of the vehicle 100 prioritizes the plurality of generated pull-out paths. For the prioritization, the movement distances of other vehicles, required for pull-out of the vehicle 100, and the headings of the other vehicles may first be considered, and a swing-out radius of the vehicle 100 and areas over which the pull-out paths of the vehicle 100 overlap with the other vehicles may further be considered.

Then, the processor of the vehicle 100 determines whether other vehicles can communicate with the vehicle 100 in a descending order of the priority levels of the plurality of generated pull-out paths. The processor of the vehicle 100 transmits and receives information to and from another vehicle determined to be communicable.

For example, the processor of the vehicle 100 determines the priority levels of the first pull-out path 1601 and the second pull-out path 1602 according to the above-described condition in FIG. 16. if the priority of the first pull-out path 1601 is determined to be higher, then the processor of the vehicle 100 determines whether the first other vehicle OB100 is communicable, and transmits and receives information to and from the first other vehicle OB100.

According to another example of the second implementation of the present disclosure, when there are a plurality of other vehicles blocking pull-out of the vehicle 100, the processor of the vehicle 100 transmits and receives information to and from a specific other vehicle in an ascending order of distances to the vehicle 100.

For example, when the first other vehicle OB100 and the second first other vehicle OB200 block one pull-out path, and the first other vehicle OB100 is nearer to the vehicle 100 than the second first other vehicle OB200, the processor of the vehicle 100 transmits and receives information to and from the nearer first other vehicle OB100 with priority.

When the first other vehicle OB100 moves for a specific distance as a result of the information transmission and reception, the processor of the vehicle 100 transmits and receives information to and from the next-nearer second other vehicle OB200.

Or the processor of the vehicle 100 may generate another pull-out path based on a condition modified by the result of the movement of the first other vehicle OB100, without directly transmitting and receiving information to and from the second other vehicle OB200. That is, the processor of the vehicle 100 may update a pull-out path based on a new condition.

Implementation 3

Figure 17:
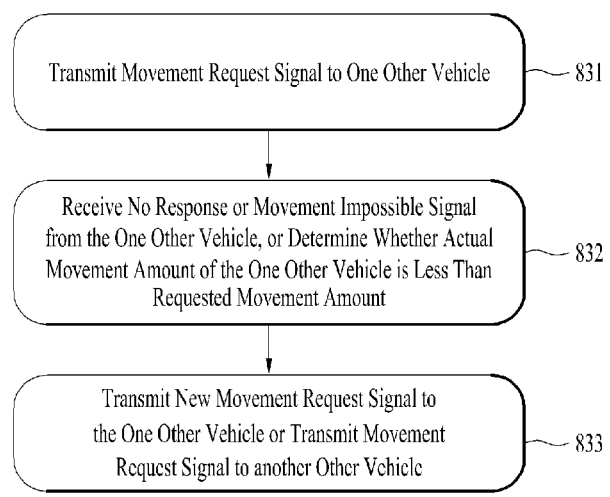
FIGS. 17, 18, and 19 are diagrams illustrating examples of securing a pull-out path of a vehicle according to a third implementation of the present disclosure.
Figure 18:
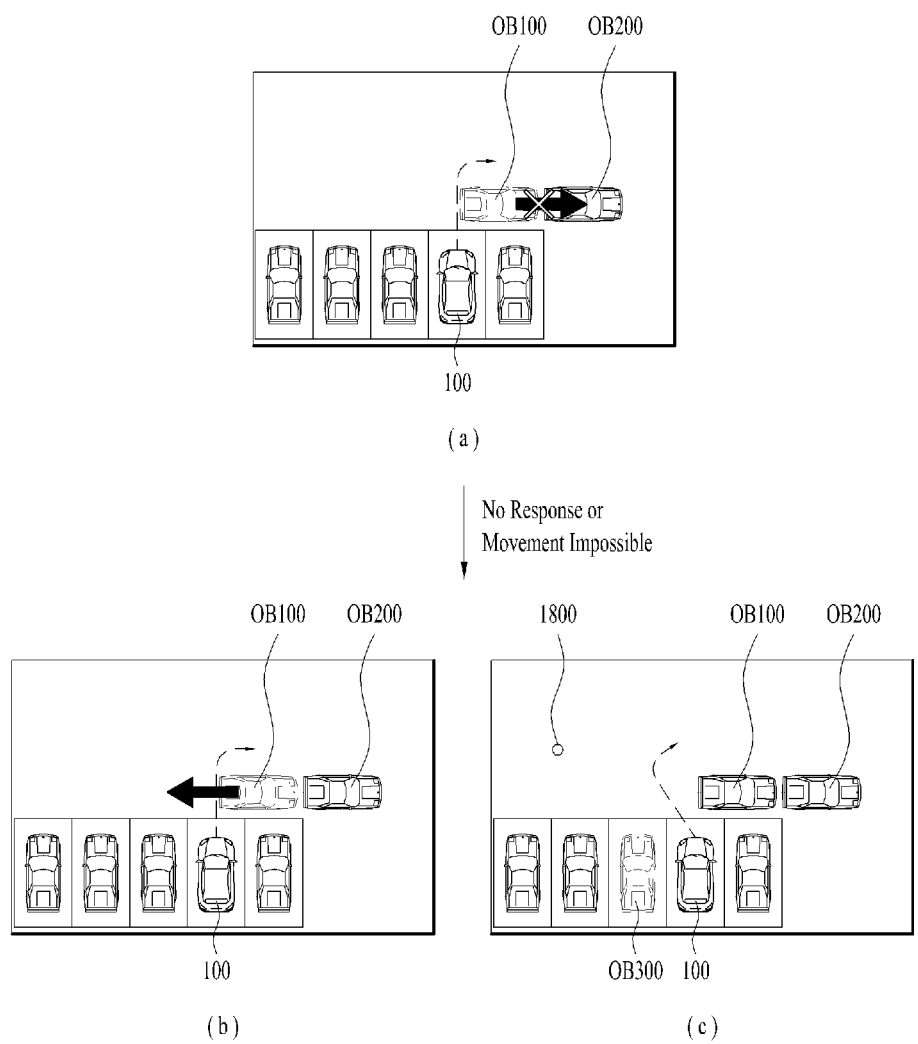
Figure 19:
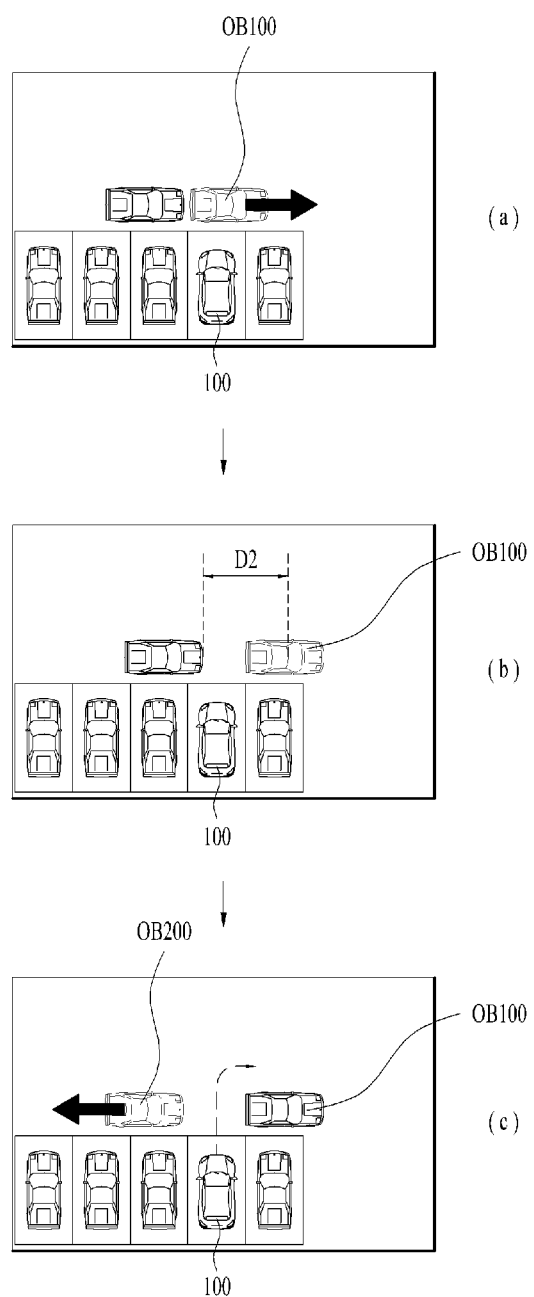

FIGS. 17, 18 and 19 are views illustrating a method of securing a pull-out path of a vehicle according to a third implementation of the present disclosure. In the following description, it may be understood that at least one processor of the vehicle 100, as described below, may be implemented by the controller 170 illustrated in FIG. 7. Further, an object, as described below, may include various types of objects, including another vehicle.

FIG. 17 is a flowchart illustrating a method of securing a pull-out path of the vehicle 100 according to the third implementation of the present disclosure. It may be understood that steps 831, 832, and 833 of FIG. 17 are included in step 810 of FIG. 8.

FIG. 18(*a*) illustrates transmission of a movement request signal to the first other vehicle OB100 by the processor of the vehicle 100 in step 831 of FIG. 17. Unlike the aforedescribed examples of FIGS. 10 and 11, the first other vehicle OB100 is not capable of moving based on information about a movement direction and a movement distance, received from the vehicle 100 due to the second other vehicle OB200 parked ahead of the first other vehicle OB100 in FIG. 18(*a*). In this case, the first other vehicle OB100 may transmit a signal indicating movement impossible to the vehicle 100, or may not transmit a response signal to the vehicle 100.

FIGS. 18(*b*) and 18(*c*) illustrate a method of generating a pull-out path by the vehicle 100, in the case where the first other vehicle OB100 transmits a signal indicating movement impossible to the vehicle 100 or does not transmit a response signal to the vehicle 100.

In step 832 of FIG. 17, the processor of the vehicle 100 receives a signal indicating movement impossible or no response signal from the first other vehicle OB100.

Then, the processor of the vehicle 100 transmits a new movement request signal to the first other vehicle OB100, as illustrated in FIG. 18(b). The new movement request signal may include information about movement, different from the previous transmitted and received information. For example, a new movement request signal requesting the first other vehicle OB100 to move backward is transmitted to the first other vehicle OB100. when the first other vehicle OB100 moves backward in response to the new movement request signal, the processor of the vehicle 100 generates a pull-out path and pulls out the vehicle 100.

In some scenarios, unlike FIG. 18(b), the processor of the vehicle 100 may transmit a movement request signal to a third other vehicle OB300, not the first other vehicle OB100. For example, the processor of the vehicle 100 may transmit, to the third other vehicle OB300, a signal requesting the third other vehicle OB300 to move to a first position 1800 and then return to an original position after a predetermined time of stop. Then, when the third other vehicle OB300 moves to the first position 1800, the processor of the vehicle 100 generates a pull-out path and pulls out the vehicle 100.

FIG. 19 illustrates a method of generating a pull-out path by the vehicle 100, in the case where an actual movement distance of the first other vehicle OB100 is shorter than a movement distance requested to the first other vehicle OB100.

FIG. 19(a) illustrates transmission of a movement request signal to the first other vehicle OB100 blocking at least one pull-out path by the vehicle 10. That is, the processor of the vehicle 100 transmits a movement request signal including information about a calculated movement direction and movement distance D1 to the first other vehicle OB100 in step 830 of FIG. 8.

As illustrated in FIG. 19(b), when the first other vehicle OB100 moves, the processor of the vehicle 100 compares the movement distance D1 indicated by the movement request signal transmitted to the first other vehicle OB100 with an actual movement distance D2 of the first other vehicle OB100.

In step 832 of FIG. 17, the processor of the vehicle 100 may determine that the actual distance D2 of the first other vehicle OB100 is shorter than the movement distance D1 indicated by the movement request signal transmitted to the first other vehicle OB100.

In this case, the processor of the vehicle 100 transmits a new movement request signal to the second other vehicle OB200 near to the vehicle 100, other than the first other vehicle OB100, as illustrated in FIG. 19(c) (step 833 in FIG. 17). The new movement request signal may include information different from previous transmitted and received information.

Finally, as illustrated in FIG. 19(c), when the second other vehicle OB200 moves backward in response to reception of the movement request signal, the processor of the vehicle 100 generates a pull-out path from a parking space and pulls out the vehicle 100.

Implementation 4

FIG. 20 is a plan view illustrating a method of securing a pull-out path for a vehicle according to a fourth implementation of the present disclosure. In the following description, it may be understood that at least one processor of the vehicle 100, as described below, may be implemented by the controller 170 illustrated in FIG. 7. Further, an object, as described below, may include various types of objects, including another vehicle.

FIG. 20(a) illustrates a case in which the first other vehicle OB100 is double-parked near to the parallel-parked vehicle 100, thus blocking at least one pull-out path of the vehicle 100. The processor of the vehicle 100 may determine through the object detection device 300 whether at least one pull-out path of the vehicle 100 is blocked.

Then, when the second other vehicle OB200 in front of the vehicle 100 leaves a parking space as illustrated in FIG. 20(b), the processor of the vehicle 100 may control the vehicle 100 to move forward to a place where it is easier to secure a pull-out path than at a current location of the vehicle 100. Similarly to FIG. 20(b), when the third other vehicle OB300 behind the vehicle 100 leaves the parking space in FIG. 20(c), the processor of the vehicle 100 may control the vehicle 100 to move backward to a place where it is easier to secure a pull-out path than at the current location of the vehicle 100.

While the fourth implementation of the present disclosure illustrated in FIG. 20 has been described in the context of double-parking of another vehicle in a parallel parking space, by way of example, the same thing is applicable to double-parking of another vehicle in a perpendicular parking space.

In some scenarios, the fourth implementation of the present disclosure described with reference to FIG. 20 may have a technical effect of solving the problem that a pull-out path of a vehicle may be difficult to be secured due to an ambient environment change after the vehicle is parked.

Implementation 5

Figure 21:
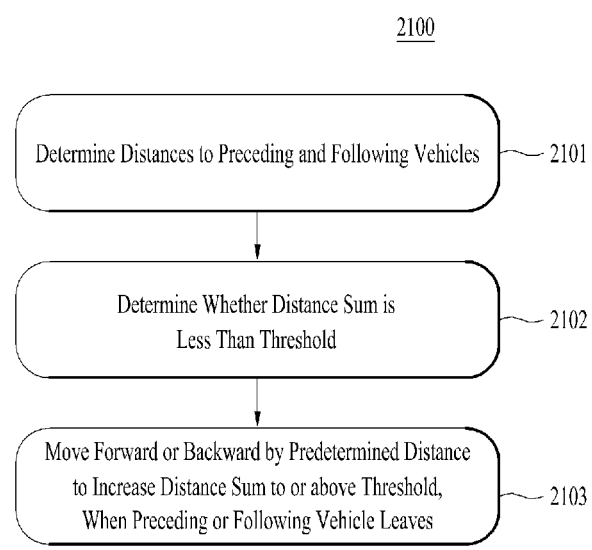
Figure 22:
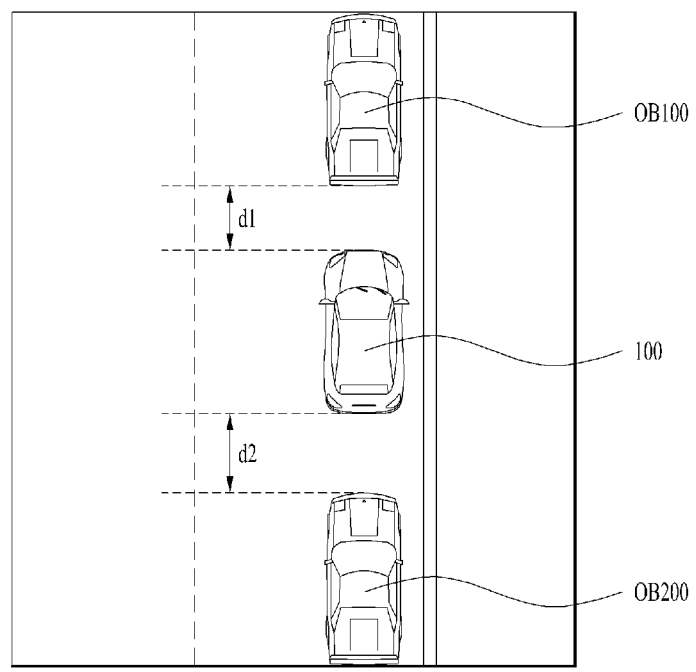

FIGS. 21, 22 and 23 are views illustrating a method of securing a pull-out path for a vehicle according to a fifth implementation of the present disclosure. In the following description, it may be understood that at least one processor of the vehicle 100, as described below, may be implemented by the controller 170 illustrated in FIG. 7. Further, an object, as described below, may include various types of objects, including another vehicle.

FIG. 21 is a flowchart illustrating the method of securing a pull-out path for a vehicle according to the fifth implementation of the present disclosure. Referring to step 2101 of FIG. 21 and FIG. 22, when the vehicle 100 is completely parked, the processor of the vehicle 100 determines a first distance d1 to the first other vehicle OB100 parked in front of the vehicle 100 and a second distance d2 to the second other vehicle OB200 parked behind the vehicle 100. The first and second distances d1 and d2 may be understood as distances required for the parked vehicle 100 to leave a parking space.

After the vehicle 100 is parked, an ambient environment of the vehicle 100 may be changed. For example, although when the vehicle 100 is parked, the sum of the first and second distances d1 and d2 is equal to or larger than a threshold, a change in the ambient environment of the vehicle 100 may lead to the sum of the first and second distances d1 and d2 less than or equal to the threshold as illustrated in FIG. 23(a). Particularly, this situation may occur frequently in a parallel parking space without parking lines.

In step 2102 of FIG. 21, the processor of the vehicle 100 determines whether the sum of the first and second distances d1 and d2 has been decreased to below the threshold. when determining that the sum of the first and second distances d1 and d2 has been decreased to below the threshold, the processor of the vehicle 100 controls the vehicle 100 to move in one direction, forward or backward when at least one of the first other vehicle OB100 or the second other vehicle OB200 leaves, so that the sum of the first and second distances d1 and d2 may become equal to or larger than the threshold, as illustrated in step 2103 of FIG. 21 and FIG. 23(b).

In some implementations, the processor of the vehicle 100 compares the sum of the first and second distances d1 and d2 with a threshold in FIGS. 21, 22 and 23. Unlike this method, the processor of the vehicle 100 may compare each of the first and second distances d1 and d2 with a threshold.

That is, when the first other vehicle OB100 pulls out, the processor of the vehicle 100 may move the vehicle 100 forward so that the second distance d2 may be equal to or larger than a predetermined threshold, and when the second other vehicle OB200 pulls out, the processor of the vehicle 100 may move the vehicle 100 backward so that the first distance d1 may be equal to or larger than a predetermined threshold.

As is apparent from the foregoing description, in some scenarios, the first to fifth implementations of the present disclosure may have the following one or more effects.

First, according to the first implementation of the present disclosure, information about movement of another vehicle blocking a pull-out path of an autonomous vehicle may be transmitted and received to and from the other vehicle, and the autonomous vehicle may pull out of a parking slot based on the result of the information transmission and reception.

Secondly, according to the second implementation of the present disclosure, only when an autonomous vehicle generates a plurality of pull-out paths and another vehicle blocks all of the pull-out paths, the autonomous vehicle transmits and receives information to and from the other vehicle. Therefore, an operation of transmitting and receiving unnecessary information to and from the other vehicle is not performed.

Thirdly, according to the third implementation of the present disclosure, in the case where no response is received from another vehicle, a signal indicating movement impossible is received from the other signal, and an actual movement distance of the other vehicle is less than a requested movement distance, an autonomous vehicle may transmit a new movement request signal to the other vehicle, or a movement request signal to another other vehicle.

Fourthly, according to the fourth implementation of the present disclosure, the problem that a pull-out path of an autonomous vehicle is not secured due to an ambient environment change after the autonomous vehicle is parked may be solved.

Fifthly, according to the fifth implementation of the present disclosure, the distances to vehicles ahead of and behind an autonomous vehicle are determined and the autonomous vehicle moves forward or backward for a predetermined distance so that the distances may not be decreased to below a threshold. Therefore, a space for pull-out of the autonomous vehicle may be secured.

The present disclosure may be implemented as code that can be written on a computer-readable recording medium and thus read by a computer system. The computer-readable recording medium may be any type of recording device in which data is stored in a computer-readable manner. Examples of the computer-readable recording medium include a Hard Disk Drive (HDD), a Solid State Disk (SSD), a Silicon Disk Drive (SDD), a Read Only Memory (ROM), a Random Access Memory (RAM), a Compact Disk ROM (CD-ROM), a magnetic tape, a floppy disc, an optical data storage, and a carrier wave (e.g., data transmission over the Internet). The computer may include a processor or a controller. The above implementations are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. An autonomous vehicle that is configured to generate a pull-out path for the autonomous vehicle to perform a pull-out operation from a stationary state, the autonomous vehicle comprising:
 an object detection device configured to detect a plurality of objects within a distance range of the autonomous vehicle;
 at least one processor; and
 at least one non-transitory computer memory that is operably connectable to the at least one processor and that has stored thereon instructions which, when executed by the at least one processor, cause the at least one processor to perform operations comprising:
  generating a plurality of pull-out paths for the autonomous vehicle to perform the pull-out operation from the stationary state;
  based on a detection of at least one object of the plurality of objects that is blocking at least one pull-out path of the plurality of pull-out paths of the autonomous vehicle:
   selecting the at least one pull-out path based on one of (i) movement distances corresponding to the plurality of objects that would allow the autonomous vehicle to perform the pull-out operation, (ii) priority levels for the plurality of pull-out paths, or (iii) ascending order of the distances between the autonomous vehicle and the plurality of objects;
   selecting the at least one object based on the selected at least one pull-out path;
   transmitting first information to the selected at least one object through a communication device of the autonomous vehicle;
   determining whether second information is received from the selected at least one object through the communication device; and
   controlling the autonomous vehicle to perform the pull-out operation from the stationary state based on a result of transmitting the first information and the determination of whether the second information was received from the selected at least one object.

2. The autonomous vehicle according to claim 1, wherein the first information comprises information regarding at least one movement for the selected at least one object.

3. The autonomous vehicle according to claim 2, wherein the operations further comprise:
 for each object among the plurality of objects, executing according to an ascending order of the movement distances corresponding to the plurality of objects that would allow the autonomous vehicle to perform the pull-out operation:
  determining whether communication can be established with an object among the plurality of objects,
  selecting the at least one pull-out path based on a determination that communication can be established with the object, selecting the at least one object based on the selected at least one pull-out path, and transmitting the first information to the selected at least one object with which communication can be established.

4. The autonomous vehicle according to claim 2, wherein the operations further comprise:

for each object among the plurality of objects, executing according to a descending order of the priority levels for the plurality of pull-out paths, and based on an association between the plurality of objects blocking the plurality of pull-out paths:

determining whether communication can be established with an object among the plurality of objects, selecting the at least one pull-out path based on a determination that communication can be established with the object, selecting the at least one object based on the selected at least one pull-out path, and transmitting the first information to the selected at least one object with which communication can be established.

5. The autonomous vehicle according to claim 2, wherein the operations further comprise:

for each object among the plurality of objects, executing according to an ascending order of the distances between the autonomous vehicle and the plurality of objects:

determining whether communication can be established with a first object among the plurality of objects, selecting the at least one pull-out path based on a determination that communication can be established with the first object, selecting the first object based on a first pull-out path of the selected at least one pull-out path, and transmitting the first information to the selected first object with which communication can be established.

6. The autonomous vehicle according to claim 5, wherein the operations further comprise:

based on a movement of the selected first object as a result of the transmission of the first information to the selected first object and the reception of the second information from the selected first object:

determining whether communication can be established with a second object among the plurality of objects, according to the ascending order of the distances between the autonomous vehicle and the plurality of objects, selecting a second pull-out path based on a determination that communication can be established with the second object, selecting the second object based on the selected second pull-out path, and transmitting third information to the selected second object with which communication can be established.

7. The autonomous vehicle according to claim 5, wherein the operations further comprise:

based on a movement of the selected first object as a result of the transmission of the first information to the selected first object and the reception of the second information from the selected first object:

generating a different pull-out path based on a condition that was modified by the movement of the first object.

8. The autonomous vehicle according to claim 2, wherein the operations further comprise:

based on a determination that (i) the second information is not received from the selected at least one object or that (ii) the second information received from the selected at least one object indicates that the selected at least one object is unable to move:

transmitting third information regarding a different movement for the selected at least one object, different from the previously transmitted first information, to the selected at least one object through the communication device of the autonomous vehicle.

9. The autonomous vehicle according to claim 2, wherein the operations further comprise:

based on an actual movement distance of the selected at least one object being less than a requested movement distance included in the first information that was transmitted to the selected at least one object:

transmitting third information regarding a different movement for the selected at least one object, different from the previously transmitted first information, to the selected at least one object through the communication device of the autonomous vehicle.

10. The autonomous vehicle according to claim 1, wherein the operations further comprise:

based on the autonomous vehicle being parallel-parked, determining a first distance to a first object located in front of the autonomous vehicle and a second distance to a second object located behind the autonomous vehicle.

11. The autonomous vehicle according to claim 10, wherein the operations further comprise:

based on the first object moving away from the autonomous vehicle, controlling the autonomous vehicle to drive forwards and increase the second distance to the second object to be greater than or equal to a first threshold distance; and based on the second object moving away from the autonomous vehicle, controlling the autonomous vehicle to drive backwards and decrease the first distance to the first object to be greater than or equal to a second threshold distance.

12. The autonomous vehicle according to claim 1, wherein selecting the at least one pull-out path further includes selecting the at least one pull-out path based on a swing-out radius of the autonomous vehicle and areas over which the plurality of pull-out paths overlap with the plurality of objects.

13. A method of generating a pull-out path for an autonomous vehicle to perform a pull-out operation from a stationary state, the method comprising:

generating a plurality of pull-out paths for the autonomous vehicle to perform the pull-out operation from the stationary state; and based on a detection of at least one object of a plurality of objects that is blocking at least one pull-out path of the plurality of pull-out paths of the autonomous vehicle:

selecting the at least one pull-out path based on one of (i) movement distances corresponding to the plurality of objects that would allow the autonomous vehicle to perform the pull-out operation, (ii) priority levels for the plurality of pull-out paths, or (iii) ascending order of the distances between the autonomous vehicle and the plurality of objects;

selecting the at least one object based on the selected at least one pull-out path;

transmitting first information to the selected at least one object through a communication device of the autonomous vehicle;
determining whether second information is received from the selected at least one object through the communication device; and
controlling the autonomous vehicle to perform the pull-out operation from the stationary state based on a result of transmitting the first information and the determination of whether the second information was received from the selected at least one object.

14. The method according to claim 13, wherein the first information comprises information regarding at least one movement for the selected at least one object.

15. The method according to claim 14, further comprising:
for each object among the plurality of objects, executing according to an ascending order of the movement distances corresponding to the plurality of objects that would allow the autonomous vehicle to perform the pull-out operation:
determining whether communication can be established with an object among the plurality of objects,
selecting the at least one pull-out path based on a determination that communication can be established with the object,
selecting the at least one object based on the selected at least one pull-out path, and
transmitting the first information to the selected at least one object with which communication can be established.

16. The method according to claim 14, further comprising:
for each object among the plurality of objects, executing according to a descending order of the priority levels for the plurality of pull-out paths, and based on an association between the plurality of objects blocking the plurality of pull-out paths:
determining whether communication can be established with an object among the plurality of objects,
selecting the at least one pull-out path based on a determination that communication can be established with the object,
selecting the at least one object based on the selected at least one pull-out path, and
transmitting the first information to the selected at least one object with which communication can be established.

17. The method according to claim 14, further comprising:
for each object among the plurality of objects, executing according to an ascending order of the distances between the autonomous vehicle and the plurality of objects:
determining whether communication can be established with a first object among the plurality of objects,
selecting the at least one pull-out path based on a determination that communication can be established with the first object,
selecting the first object based on a first pull-out path of the selected at least one pull-out path, and
transmitting the first information to the selected first object with which communication can be established.

18. The method according to claim 17, further comprising:
based on a movement of the selected first object as a result of the transmission of the first information to the selected first object and the reception of the second information from the selected first object:
determining whether communication can be established with a second object among the plurality of objects, according to the ascending order of the distances between the autonomous vehicle and the plurality of objects,
selecting a second pull-out path based on a determination that communication can be established with the second object,
selecting the second object based on the selected second pull-out path, and
transmitting third information to the selected second object with which communication can be established.

19. The method according to claim 17, further comprising:
based on a movement of the selected first object as a result of the transmission of the first information to the selected first object and the reception of the second information from the selected first object:
generating a different pull-out path based on a condition that was modified by the movement of the first object.

20. The method according to claim 13, wherein selecting the at least one pull-out path further includes selecting the at least one pull-out path based on a swing-out radius of the autonomous vehicle and areas over which the plurality of pull-out paths overlap with the plurality of objects.

* * * * *